United States Patent [19]
Nelson et al.

[11] Patent Number: 5,719,786
[45] Date of Patent: Feb. 17, 1998

[54] DIGITAL MEDIA DATA STREAM NETWORK MANAGEMENT SYSTEM

[75] Inventors: David L. Nelson, Framingham; Premkumar Uppaluru, North Andover; Pasquale Romano, Boston; Jeffrey L. Kleiman, Lexington, all of Mass.

[73] Assignee: Novell, Inc., Provo, Utah

[21] Appl. No.: 13,009

[22] Filed: Feb. 3, 1993

[51] Int. Cl.$^6$ .................................................. G06K 15/00
[52] U.S. Cl. ........................................ 364/514 A; 348/19
[58] Field of Search ........................ 364/514 A, 715.02; 348/19, 24; 395/114, 154, 118

*Primary Examiner*—Ellis B. Ramirez
*Assistant Examiner*—Thomas Peeso
*Attorney, Agent, or Firm*—Snell & Wilmer

[57] ABSTRACT

A computer-based media data processor for controlling transmission of digitized media data in a packet switching network. When the processor receives a request from a network client node for presentation of specified media data stream presentation unit sequences the processor in response retrieves media data from a corresponding media access location, determines the media data type of each presentation unit in the retrieved media data, and designates each retrieved presentation unit to a specific media data presentation unit sequence based on the media data type determination for that presentation unit. The processor then assembles a sequence of presentation descriptors for each of the specific presentation unit sequences, all presentation descriptors in an assembled sequence being of a common media data type, and then assembles transmission presentation unit packets each composed of at least a portion of a presentation descriptor and its media data, all presentation descriptors and media data in an assembled packet being of a common media data type. The assembled packets are then released for transmission via the network to the client processing node requesting presentation of the specified presentation unit sequences.

105 Claims, 12 Drawing Sheets

DIGITAL MEDIA DATA STREAM NETWORK MANAGEMENT SYSTEM

BACKGROUND OF THE INVENTION

This invention relates to the management of digitized media stream data, e.g., digitized video, and particularly relates to the capture, storage, distribution, access and presentation of digital video within a network computing environment.

Extensive technological advances in microelectronics and digital computing systems have enabled digitization of a wide range of types of information; for example, digital representations of text, graphics, still images and audio are now in widespread use. Advances in compression, storage, transmission, processing and display technologies have recently provided the capabilities required to extend the field of digitization to additionally include video information.

Conventionally, digitized audio and video are presented on, for example, a computer system or network by capturing and storing the audio and video streams in an interleaved fashion, i.e., segments of the two streams are interleaved. This requires storage of the digital audio and video in a single stream storage container, and further requires retrieving chunks of interleaved audio and video data at an aggregate rate which matches the nominal rate of an active presentation sequence. In this way, one unit of video (say, a frame) is physically associated in storage with one unit of audio (say, a corresponding 33 msec clip), and the two are retrieved from storage as a unit. Sequences of such audio and video units are then provided to a presentation and decoder digital subsystem in an alternating fashion, whereby each audio and video unit of a pair is provided in sequence.

Computer systems that provide this audio and video management functionality typically include digital compression/decompression and capture/presentation hardware and software, and digital management system software, all of which is based upon and depends upon the interleaved format of the audio and video streams it processes.

Currently, handling of audio and video in a network environment is also based on a scheme in which capture, storage, and transmission of audio and video must be carried out using interleaved audio and video streams. This interleaving extends to the transmission of audio and video streams across the network in an interleaved format within transmission packets.

Synchronization of audio with video during an active presentation sequence is conventionally achieved by initially interleaving the audio and video streams in storage and then presenting audio and video chunks at the nominal rate specified for an active presentation sequence.

In "Time Capsules: An Abstraction for Access to continuous-Media Data," by Herrtwich, there is disclosed a frame-work based on time capsules to describe how timed data shall be stored, exchanged, and accessed in real-time systems. When data is stored into such a time capsule, a time stamp and a duration value are associated with the data item. The time capsule abstraction includes the notion of a dock for ensuring periodic data access that is typical for continuous-media applications. By modifying the parameters of a dock, presentation effects such as time lapses or slow motion may be achieved.

While the Herrtwich disclosure provides a time capsule abstraction for managing time-based data, the disclosure does not provide any technique for synchronizing time-based data based on the time capsule abstraction, and does not address the requirements of time-based data management in a network environment. Furthermore, the disclosure does not address processing of time-based data streams as a function of their interleaved format or manipulation of that format.

SUMMARY OF THE INVENTION

In general, in one aspect, the invention features a computer-based media data processor for controlling the computer presentation of digitized continuous time-based media data composed of a sequence of presentation units. Each presentation unit is characterized by a prespecified presentation duration and presentation time during a computer presentation of the media data and is further characterized as a distinct media data type. In the processor of the invention, a media data input manager retrieves media data from a computer storage location in response to a request for computer presentation of specified presentation unit sequences, and determines the media data type of each presentation unit in the retrieved media data. The input manager then designates each retrieved presentation unit to a specified media data presentation unit sequence based on the media data type determination for that presentation unit. The input manager then assembles a sequence of presentation descriptors for each of the specified presentation unit sequences, each descriptor comprising media data for one designated presentation unit in that sequence, and each sequence of presentation descriptors being of a common media data type; and then associates each presentation descriptor with a corresponding presentation duration and presentation time, based on the retrieved media data. Finally, the input manager links the presentation descriptors of each sequence to establish a progression of presentation units in that sequence.

A media data interpreter of the invention indicates a start time of presentation processing of the presentation descriptor sequences, and accordingly, maintains a current presentation time as the sequences are processed for presentation. The interpreter counts each presentation unit in the media data sequences after that unit is processed for presentation, to maintain a distinct current presentation unit count for each sequence, and compares for each of the presentation unit sequences a product of the presentation unit duration and the current presentation unit count of that sequence with the current presentation time after each presentation unit from that sequence is processed for presentation. Based on the comparison, the interpreter releases a presentation unit next in that presentation unit sequence to be processed for presentation when the product matches the current presentation time count, and deletes a presentation unit next in that presentation unit sequence when the product exceeds the current presentation time count.

In general, in another aspect, the invention features a media data processor for controlling transmission of digitized media data in a packet switching network. Such a network comprises a plurality of client computer processing nodes interconnected via packet-based data distribution channels. In the invention, a remote media data controller receives from a client processing node a request for presentation of specified presentation unit sequences, and in response to the request, retrieves media data from a corresponding media access location. A remote media data input manager of the invention then determines the media data type of each presentation unit in the retrieved media data, and designates each retrieved presentation unit to a specified media data presentation unit sequence based on the media data type determination for that presentation unit. Then the input manager assembles a sequence of presentation descriptors for each of the specified presentation unit sequences, each descriptor comprising media data for one designated presentation unit in that sequence, and all presentation descriptors in an assembled sequence being of a common media data type. The interpreter associates each presentation descriptor with a corresponding presentation duration and presentation time, based on the retrieved media data; and finally, links the descriptors in each assembled sequence to establish a progression of presentation units in each of the specified presentation unit sequences.

A remote network media data manager of the invention assembles transmission presentation unit packets each composed of at least a portion of a presentation descriptor and its media data, all presentation descriptors and media data in an assembled packet being of a common media data type; and releases the assembled packets for transmission via the network to the client processing node requesting presentation of the specified presentation unit sequences.

A local media data controller of the invention transmits the presentation unit sequence request to the remote media data controller from the client processing node, and controls starting and stopping of sequence presentation in response to user specifications.

A local network media data manager of the invention receives at the client processing node the transmission presentation unit packets via the network, and designates a presentation unit sequence for each presentation descriptor and its media data in the received packets to thereby assemble the presentation descriptor sequences each corresponding to one specified presentation unit sequence, all presentation descriptors in an assembled sequence being of a common media data type. Then the local network media data manager links the descriptors in each assembled sequence to establish a progression of presentation units for each of the presentation unit sequences.

A local media data interpreter of the invention accepts the assembled presentation descriptor sequences one descriptor at a time and releases the sequences for presentation one presentation unit at a time. In this process, the local interpreter indicates a start time of presentation processing of the sequences, and accordingly, maintains a current presentation time as the descriptor sequences are processed for presentation. Based on the presentation duration of each presentation unit, the interpreter synchronizes presentation of the specified presentation unit sequences with the current presentation time.

In preferred embodiments, the specified media data presentation unit sequences comprise a video frame sequence including a plurality of intracoded video frames; preferably, each frame of the video frame sequence comprises an intracoded video frame, and more preferably, the video frame sequence comprises a motion JPEG video sequence and an audio sequence. In other preferred embodiments, each of the plurality of intracoded video frames comprises a key frame and is followed by a plurality of corresponding non-key frames, each key frame including media data information required for presentation of the following corresponding non-key frames.

In other preferred embodiments, synchronization of presentation of the specific presentation unit sequences is accomplished by the local media data interpreter by comparing for each of the presentation descriptors in each of the presentation descriptor sequences the presentation time corresponding to that descriptor with the currently maintained presentation time. Based on this comparison, the interpreter releases a next sequential presentation unit to be processed for presentation when the corresponding presentation time of that descriptor matches the current presentation time, and deletes a next sequential presentation unit to be processed for presentation when the current presentation time exceeds the corresponding presentation time of that descriptor.

In other preferred embodiments, synchronization of presentation of the specific presentation unit sequences is accomplished by the local media data interpreter by counting each presentation descriptor in the sequences after that presentation unit is released to be processed for presentation, to maintain a distinct current presentation unit count for each sequence. Then, the interpreter compares for each of the presentation unit sequences a product of the presentation unit duration and the current presentation descriptor count of that sequence with the currently maintained presentation time after a presentation unit from that sequence is released to be processed for presentation. Based on the comparison, the interpreter releases a next sequential presentation unit in that presentation unit sequence when the product matches the currently maintained presentation time, and deletes a next sequential presentation unit in that presentation unit sequence when the product exceeds the currently maintained presentation time.

In other preferred embodiments, the remote media data controller of the invention receives from the local media data controller, via the network, an indication of a specified presentation data rate at which the specified presentation unit sequences are to be transmitted via the network to the client node. The media data retrieved comprises a plurality of storage presentation unit sequences stored in a computer storage location, each storage presentation unit sequence composed of presentation units corresponding to a specified presentation unit sequence and all presentation units in a storage presentation unit sequence being of a common media data type. The remote media data input manager designates each of a portion of the presentation unit descriptors as the descriptor sequences are assembled, the portion including a number of descriptors based on the specified presentation data rate, each designated descriptor comprising null media data, to thereby compose the presentation descriptor sequences with only a portion of storage presentation unit media data. With this designation, the specified presentation unit sequences attain the specified presentation data rate of transmission.

In the invention, the separation of media streams and distinctly formatting of network transmission packets for each stream provides an opportunity and the facility to examine, process, and make transmission decisions about each stream and each presentation unit independent of other streams and presentation units. As a result, the media processor of the invention can make presentation decisions about a given presentation unit independent of the other units in the corresponding stream, and can make those decisions "on-the-fly". This capability provides for real time scaling and network load adjustment as a stream is retrieved, processed, and transmitted across the network.

Further aspects, features, and advantages of the invention are set forth in the following specification and the claims.

DESCRIPTION OF A PREFERRED EMBODIMENT

Figure 1:
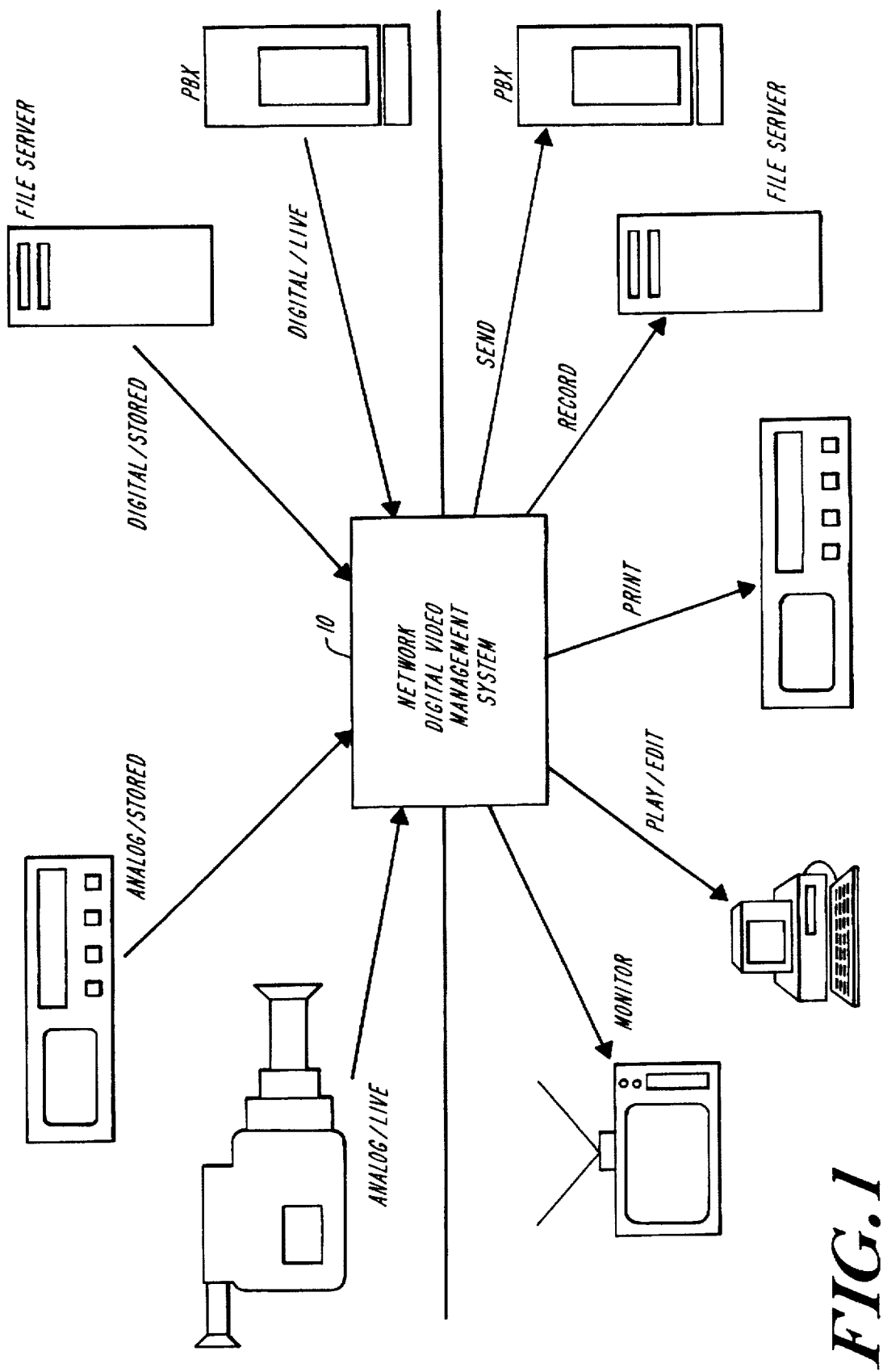
FIG. 1 is a schematic diagram of media stream access and delivery points with which the digital video management system of the invention may interface.

Referring to FIG. 1, there is illustrated the digital video management system (DVMS) 10 of the invention. The DVMS provides the ability to capture, store, transmit, access, process and present live or stored media stream data, independent of its capture or storage location, in either a stand-alone or a network environment. The DVMS accommodates media stream data, i.e., continuous, high data-rate, real-time data, including video, audio, animation, photographic stills, and other types of continuous, time-based media data. Throughout this description, the DVMS of the invention will be explained with reference to audio and video streams, but it must be remembered that any time-based media data stream may be managed in the system. In the DVMS, as shown in FIG. 1, media data may be accessed from, e.g., live analog capture, analog or digital file storage, or live digital capture from, e.g., a PBX (private branch exchange) server, among other access points. The accessed media is managed by the DVMS for delivery to, e.g., a presentation monitor, a computer system for editing and presentation on the computer, a VCR tape printer, or digital storage, or sent to a PBX server.

Of great advantage, the DVMS management scheme is independent of any particular storage or compression technology used to digitize the data streams, and further, is independent of any particular communication protocols or delivery platform of a network in which the DVMS is implemented. Additionally, the DVMS is industry standards-based yet is flexible and standards-extensible, via its layered architecture, which incorporates multiple management platforms. Each of these features and advantages will be explained in detail in the discussion to follow.

Digital Video Management System Components

The DVMS of the invention is based on a technique whereby media data streams are handled and managed as distinct and separate media data streams in which there is no interleaving of media data. Here the term "stream" is meant to represent a dynamic data type, like video, as explained above, and thus, a stream consists of dynamic information that is to be produced and consumed in a computer system or network with temporal predictability. A stream contains a succession of sequences. Sequences can themselves contain sequences; in turn, each sequence contains a succession of segments. Streams, sequences and segments, as information identifiers, have no media type-specific semantics. Rather, they are convenient abstractions for specifying and organizing dynamic data types to be managed by the management system of the invention. An easily understood analogy to streams, sequences and segments is that of documents containing chapters, sections and sentences.

Streams are characterized by their media data type, e.g., audio, video, or animation data types. Sequences represent information that is meaningful to the user. For example, a video sequence may represent a video clip containing a video scene. Segments can be convenient "chunks" of data for editing and mixing that data. Segments may also represent units of data that are temporally linked, as when using a video compression scheme that produces key video frames and corresponding following difference video frames.

In the DVMS of the invention, streams that are intended for synchronous presentation can be grouped into a stream group of distinct constituent streams (i.e., without interleaving). Although constituent streams in such a stream group may be stored in an interleaved form within a storage container, the DVMS can dynamically coordinate separately stored streams; in either case, the system processes the streams distinctly, rather than in an interleaved fashion.

Segments of streams contain presentation units. A presentation unit is a unit of continuous, temporally-based data to be presented, and accordingly, has an associated presentation time and presentation duration. A presentation time indicates the appropriate point in the sequence of a presentation at which the associated presentation unit is to be played, relative to a time base for the ongoing presentation. A presentation duration indicates the appropriate interval of time over which the associated presentation unit is to be played in the ongoing presentation. Thus, a video presentation unit comprises a video frame, and an audio presentation unit comprise a number of sound samples associated with a frame duration.

Figure 2:
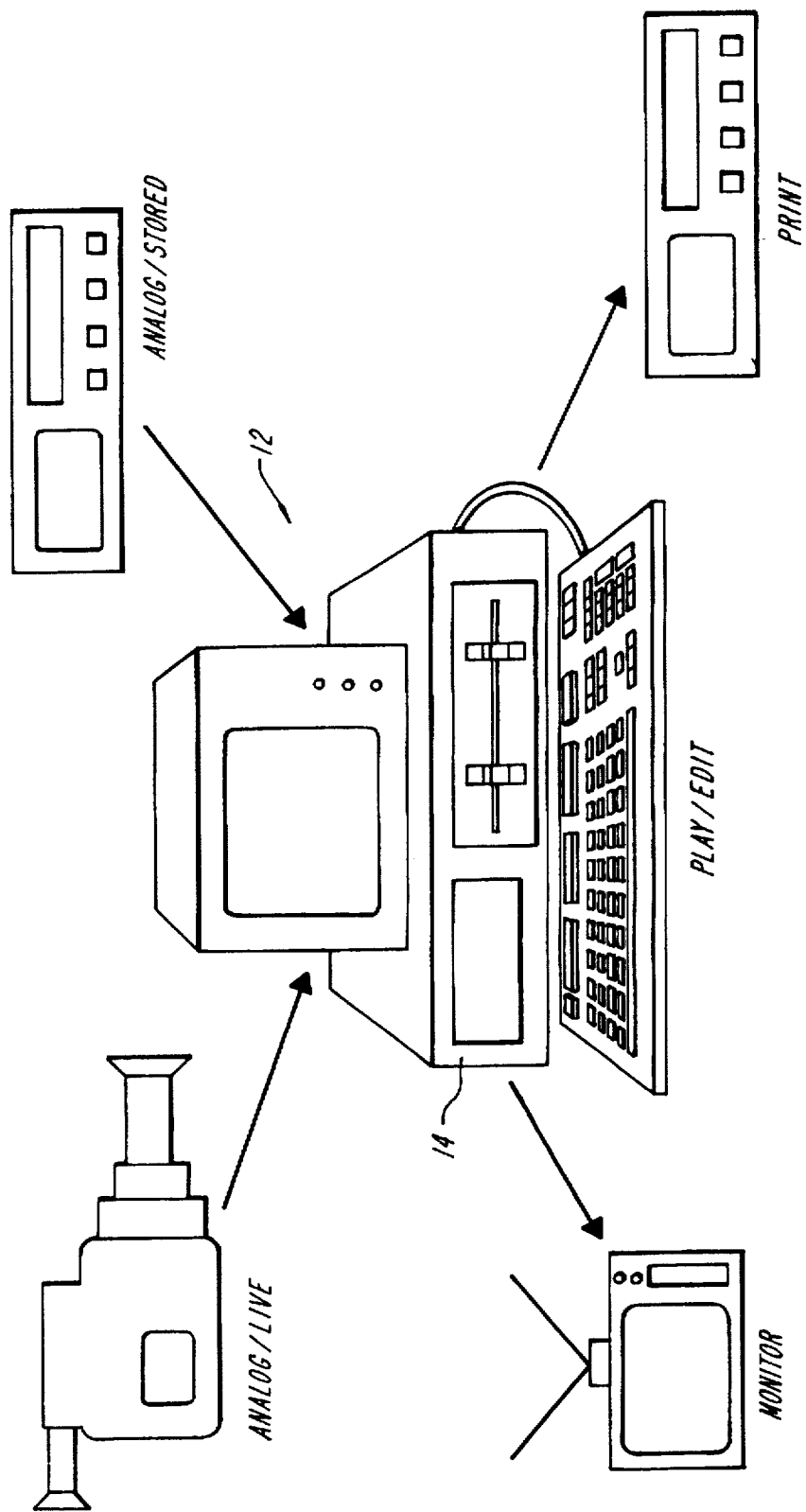
FIG. 2 is a schematic diagram of a stand-alone implementation of the digital video management system of the invention.

As mentioned above, the DVMS may be implemented in a stand-alone computer system or a computer-based, packet switched network. Referring to FIG. 2, in a stand-alone computer system implementation 12, live or stored media streams are accessed and captured for presentation and editing on the stand-alone computer 14. The captured, and optionally edited media streams may then be delivered to a presentation monitor or to a VCR tape printer utility.

Figure 3:
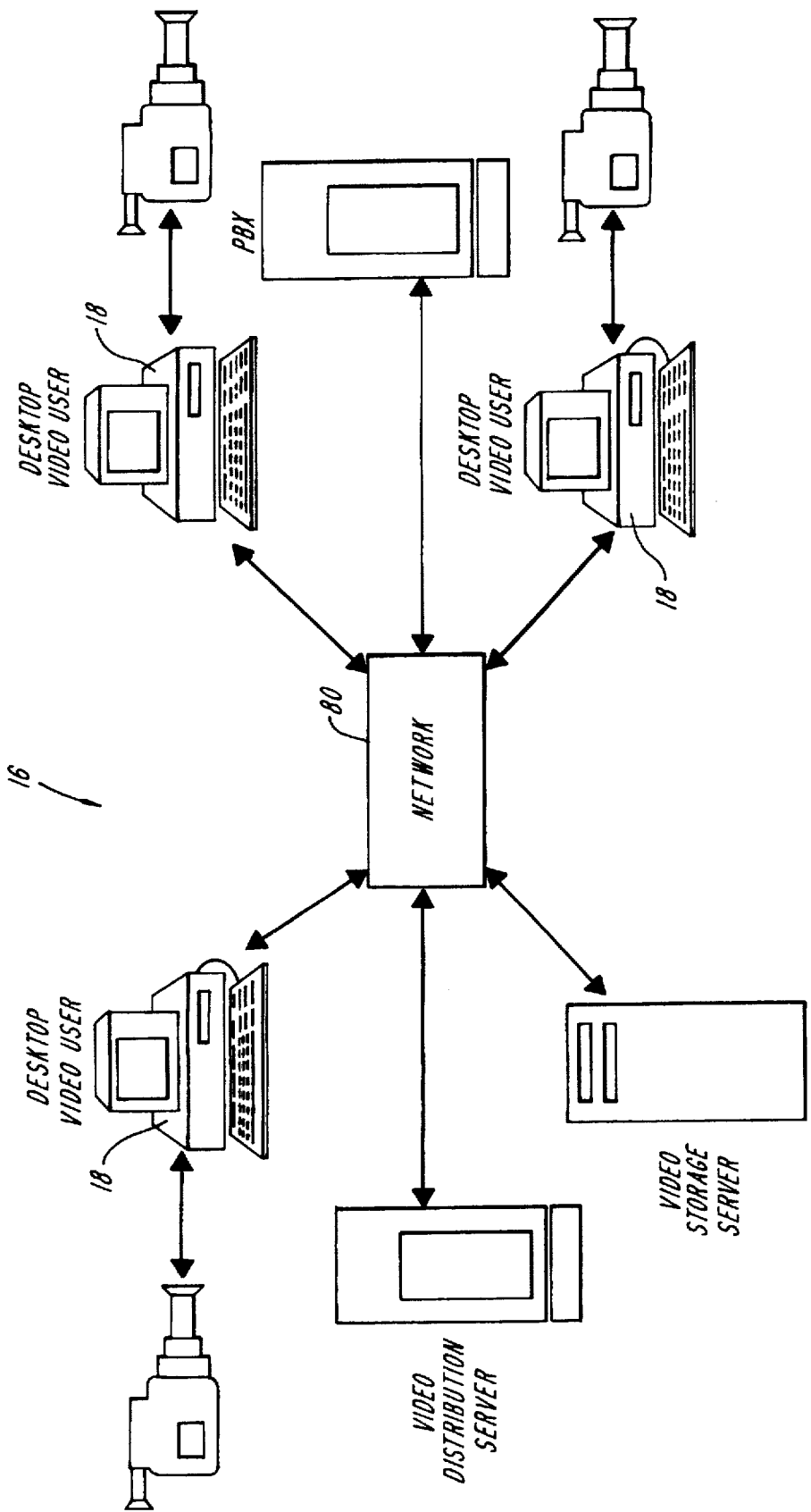
FIG. 3 is a schematic diagram of a network implementation of the digital video management system of the invention.

Referring to FIG. 3, a packet switching network in which the DVMS is implemented comprises desktop computer systems 18 which are linked via a packet switching network

80, which is controlled by the DVMS network implementation 16. The network 80 may comprise a local area network (LAN) or a wide area network (WAN), or a combination of one or more LANs and WANs. The DVMS provides access to and capture of media streams from live analog video capture, e.g., a VCR or camcorder, a network, storage or PBX server, or one of the desktop computers, and in turn manages the transmission of the media stream data across the network back to any of the access points.

The digital video management system consists of a local DVMS manager and a remote DVMS manager. The local DVMS manager provides a client operating environment, and thus resides on a stand-alone computer or each client computer in a network, "client" here being defined as a computer system or one of the access points in a network that request media data; the remote DVMS manager provides a network operating environment, and thus resides on a network server. The local DVMS manager may be implemented on, for example, IBM-compatible personal computers running Microsoft® Windows™, to thereby provide high-level, industry-standard access to underlying digital video services. This local DVMS manager implementation may support, for example, the industry-standard Microsoft®) digital video MCI API for application development. The local DVMS manager incorporates an efficient data-flow subsystem, described below, that is highly portable to other operating systems.

The DVMS system of the invention is preferably implemented as an application programming interface suite that includes interfaces for a computer programming application to include media data stream management capability within the application. Thus, the DVMS interfaces with an underlying programming application via interface calls that initiate media data stream functions within the realm of the programming application. Such an interface implementation will be understandable to those skilled in the art of C programming.

The remote DVMS manager acts to dynamically link a client and a server in the packet network environment. The architecture of this manager has the important advantage of supporting the ability to scale distinct, noninterleaved media data streams, as discussed in depth below. This ability to scale packet-based video, thereby creating scalable packet video, is a facility which permits adaptive bandwidth management for dynamic media data types in both LANs and WANs. The remote DVMS manager may be implemented as a Netware© Loadable Module, on, for example, the Novell Netware© operating system.

Local DVMS Manager

The local DVMS manager manages the access and capture of media data streams transparently, i.e., without impacting the functionality of the application program which requested that access and capture. The local DVMS manager works with a digital video system, implemented either in special purpose digital video hardware or in special purpose software-based emulation of the digital hardware.

Figure 4:
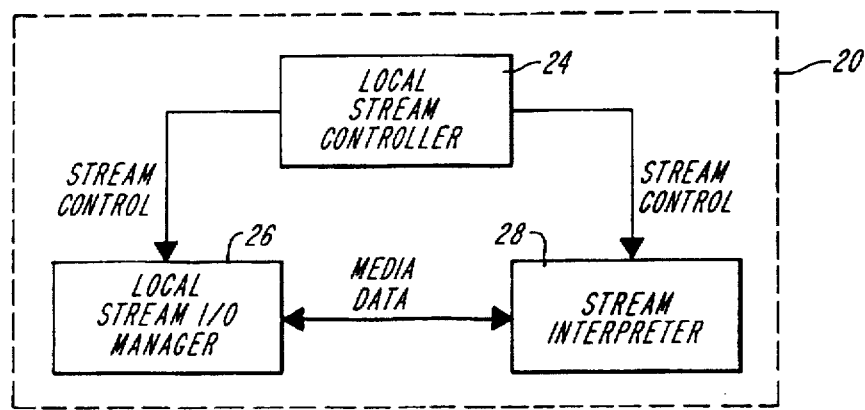
FIG. 4 is a schematic diagram of the local digital video management system manager modules of the invention.

Referring to FIG. 4, the local DVMS manager 20 consists of three modules: the stream controller 24, stream input/output (I/O) manager 26, and the stream interpreter 28. This modularity is exploited in the DVMS design to separate the flow of data in a media data streams from the flow of control information for that media stream through the system. Based on this data and control separation, streams data and stream control information are each treated as producing distinct interactions among the three manager modules, which operate as independent agents. The I/O manager, interpreter and controller agents are each mapped via the local DVMS manager to independently schedulable operating system processes with independent program control flow and data space allocation. The flow of media stream data is managed by the stream I/O manager 26 and the stream interpreter 28, while the flow of control information is managed by the stream controller 24. Each of these management functions is explained in detail below.

The stream I/O manager module 26 is responsible for the dynamic supply of media data streams, e.g., audio and video streams, from or to the stream interpreter. This module also provides efficient file format handling functions for the media data, if it is accessed via a storage file, e.g., a DVI® AVSS file. In a stand-alone implementation of the DVMS of the invention, the stream I/O manager provides retrieval and storage of media data streams from or to points of media access, such as digital or analog storage containers, while in a network implementation of the DVMS, as described below, the remote DVMS manager modules provide retrieval and storage at points of media access via the network. Most importantly, the stream I/O manager performs a translation from the representation of audio and video information as that information is stored to the corresponding dynamic computer-based representation. This translation is explained in detail below.

The stream interpreter module 28 is responsible for managing the dynamic computer-based representation of audio and video as that representation is manipulated in a stand-alone computer or a computer linked into a packet network. This dynamic management includes synchronization of retrieved audio and video streams, and control of the rate at which the audio and video information is presented during a presentation sequence. In addition, the stream interpreter module manages the capture, compression, decompression and playback of audio and video information. This module is, however, compression technology-independent and additionally is device-independent. Base services of a digital video subsystem, including, for example, hardware for capture and presentation functions, are preferably implemented to be accessed through a standard API suite of digital video primitives, which encapsulate any functions unique to a particular compression or device technology.

The following suite of primitive functions provide device-independent access to the base services of a digital video subsystem:

Open: Open a specified device, initialize it, and return a handle for further requests;

Close: Close a specified device and free up any associated resources; Get_Capabilities: Query a device's capabilities, e.g., display resolutions, compression format, etc.;

Start: Start decoding and displaying data from a stream buffer;

Stop: Stop decoding and displaying data from a stream buffer;

Get_Info: Get information about the current status of a device;

Set_Info: Set information in the device attributes.

The stream controller module 24 is responsible for the control of video and audio capture and playback functions during user-directed applications. This control includes maintaining the dynamic status of video and audio during capture or playback, and additionally, providing presentation control functions such as play, pause, step and reverse. This module is accordingly responsible for notifying an active application of stream events during audio and video capture or playback. An event is here defined as the current presentation unit number, for which an indication would be made, or the occurrence of the matching of a prespecified presentation unit number with a current presentation unit number.

During the active playback of audio and video, or other dynamic media data streams, the stream I/O manager and the streams interpreter act as the time-based producer and consumer, respectively, of the data streams being played back. Conversely, during recording of a dynamic data stream, the stream interpreter acts as the time-based stream producer and the streams I/O manager acts as the time-based stream consumer. During both playback and recording, the I/O manager and the interpreter operate autonomously and asynchronously, and all data in an active stream flows directly between them via a well-defined data channel protocol. The stream controller asynchronously sends control messages to affect the flow of data between the I/O manager and the interpreter, but the controller does not itself participate in the flow of data. As discussed below, all data flow operations are handled using a minimal number of buffer copies between, for example, a disk or network subsystem and the digital video capture and presentation hardware.

This system design is particularly advantageous in that it provides for complete transparency with respect to the domain of the I/O manager and the interpreter, thereby providing the ability to extend the system to a network client/server configuration, as explained below. Moreover, this basic three-agent unit may be concatenated or recursed to form more complex data and control functionality graphs.

In the architecture of the local DVMS manager, the activity of one of the asynchronous agents, each time it is scheduled to run while participating in a stream flow, is represented as a process cycle. The rate at which an asynchronous agent is periodically scheduled is represented as the process rate for that agent, and is measured as process cycles per second. A process period is defined as the time period between process cycles. In order to maintain continuous data flow of streams between the stream I/O manager and the stream interpreter, the limiting agent of the two must process a process period's worth of presentation units within a given process cycle. In cases in which such process rates are not achieved, the local DVMS manager can control the flow rate, as explained below. The process rate for the stream interpreter is close to the nominal presentation rate of the stream, i.e., in every process cycle, a presentation unit is processed. The stream I/O manager services several presentation units in every process cycle and thus, its process rate may be much lower than the presentation rate.

The modularity of the stream control functions provided by the stream I/O manager, interpreter and controller make the local DVMS manager architecture of the DVMS highly portable to most modern computer operating systems which support preemptive multitasking and prioritized scheduling. This architecture also provides for selective off-loading of the stream I/O manager and interpreter modules to a dedicated coprocessor for efficient data management. Most importantly, the highly decentralized nature of the manager architecture allows it to be easily adapted to LAN and WAN systems, as discussed below.

Figure 5:
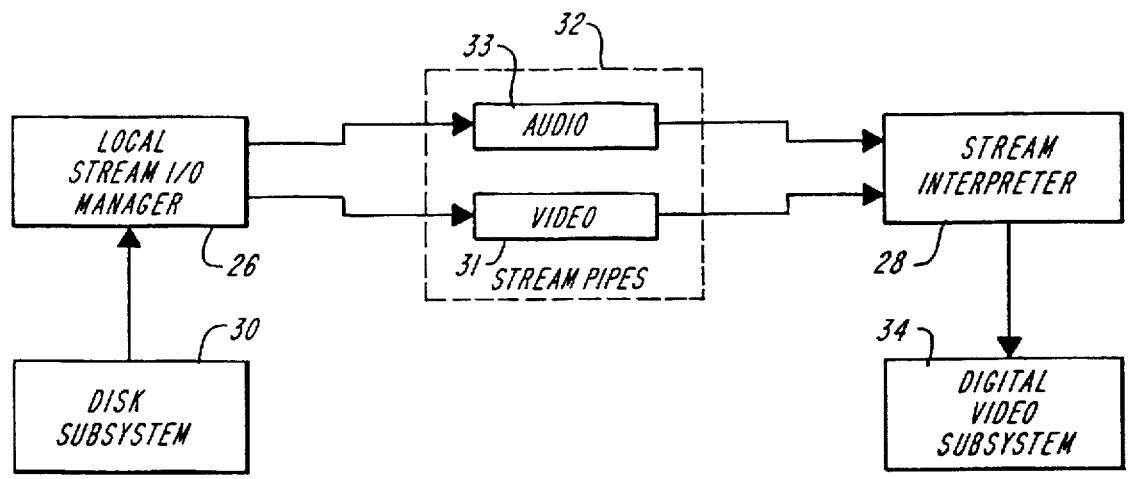
FIG. 5 is a schematic diagram illustrating the flow of media stream data between the stream I/O manager and stream interpreter modules of the local digital video management system manager of FIG. 4.

Referring to FIG. 5, when a computer implemented with the DVMS of the invention requests access to audio or video streams, the following stream flow occurs. The stream I/O manager 26 module retrieves the requested streams from a stream input 30; this stream input comprises a storage access point, e.g., a computer file or analog video source. The stream I/O manager then separates the retrieved streams according to the specified file format of each stream. If two streams, e.g., audio and video streams, which are accessed were interleaved in storage, the stream I/O manager dynamically separates the streams to then transform them to distinct internal representations, each comprising a descriptor which is defined based on their type (i.e. audio or video). Once separated, the audio and video stream data are handled both by the stream I/O manager and the stream interpreter as distinct constituent streams within a stream group. The stream I/O manager 26 then exchanges the stream data, comprising sequences of presentation units, with the stream interpreter 28 via a separate queue of presentation units called a stream pipe 32, for each constituent stream; an audio stream pipe 33 is thus created for the audio presentation units, and a video stream pipe 31 is created for the video presentation units. Each audio stream (of a group of audio streams) has its own pipe, and each video stream has its own pipe. During playback of streams, the stream I/O manager continually retrieves and produces presentation units from storage and the stream interpreter continuously consumes them, via the stream pipes, and delivers them to a digital media data subsystem for, e.g., presentation to a user.

When retrieving a plurality of streams from an input 30 in which the streams are separated (not interleaved), the stream I/O manager retrieves and queues the streams' data in a round robin fashion, but does not perform any stream separation function. The stream interpreter processes these streams in the same manner as it processes those which are originally interleaved. Thus, the stream I/O manager advantageously shields the remainder of the system from the nature of the static container 30, and further "hides" the format of the storage container, as well as the way that logically coordinated data streams are aggregated for storage. Additionally, the details of the stream interpreter implementation, such as its hardware configuration, are "hidden" from the I/O subsystem; in fact, the only means of communication between the two agents is via the well-defined stream pipe data conduits.

Figure 6:
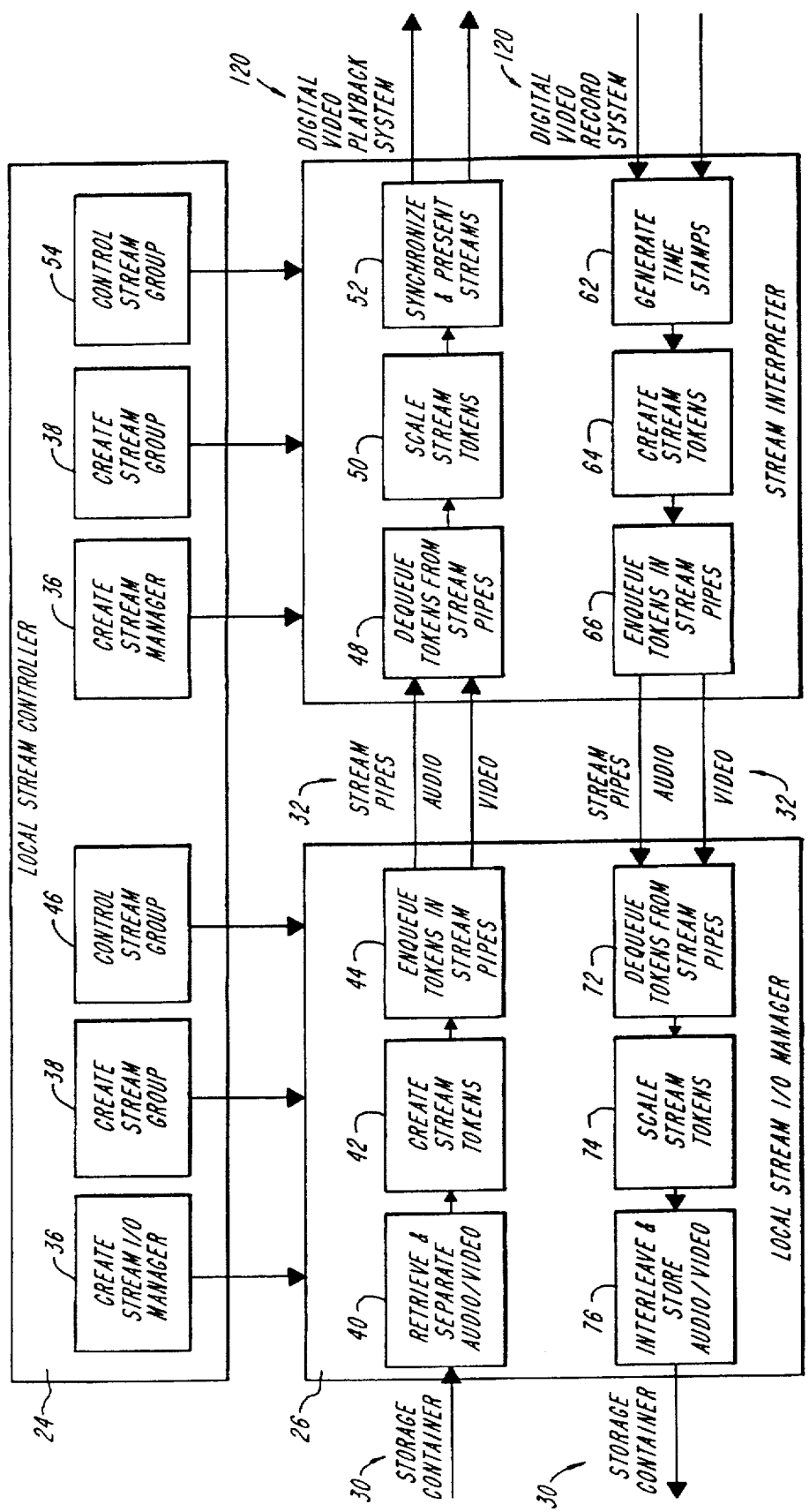
FIG. 6 is a schematic flow chart illustrating presentation and capture scenarios carried out by the local digital video management system manager of FIG. 4.

Referring also to FIG. 6, during a presentation scenario, the stream controller 24 first initializes 36 the stream I/O manager 26 and stream interpreter 28, by creating active modules of them to begin processing streams, and then defines and indicates 38 a stream group and the corresponding constituent stream names. The stream I/O manager 26 then retrieves 40 the named streams from corresponding storage containers 30 and separates the streams, if stored in an interleaved fashion. If they were not interleaved, the streams are retrieved in a round-robin fashion. Once the streams are retrieved, the streams I/O manager converts 42 the streams to an internal computer representation of stream tokens, described below. Via the stream group indication 30, each stream token is identified with a stream and a stream group by the indication provided to the stream I/O manager by the stream controller. The I/O manager then buffers 44 the streams separately, each in a distinct stream pipe 32 for consumption by the stream interpreter 28; the stream controller provides control 46 of the steam group as it is enqueued.

Figure 7:
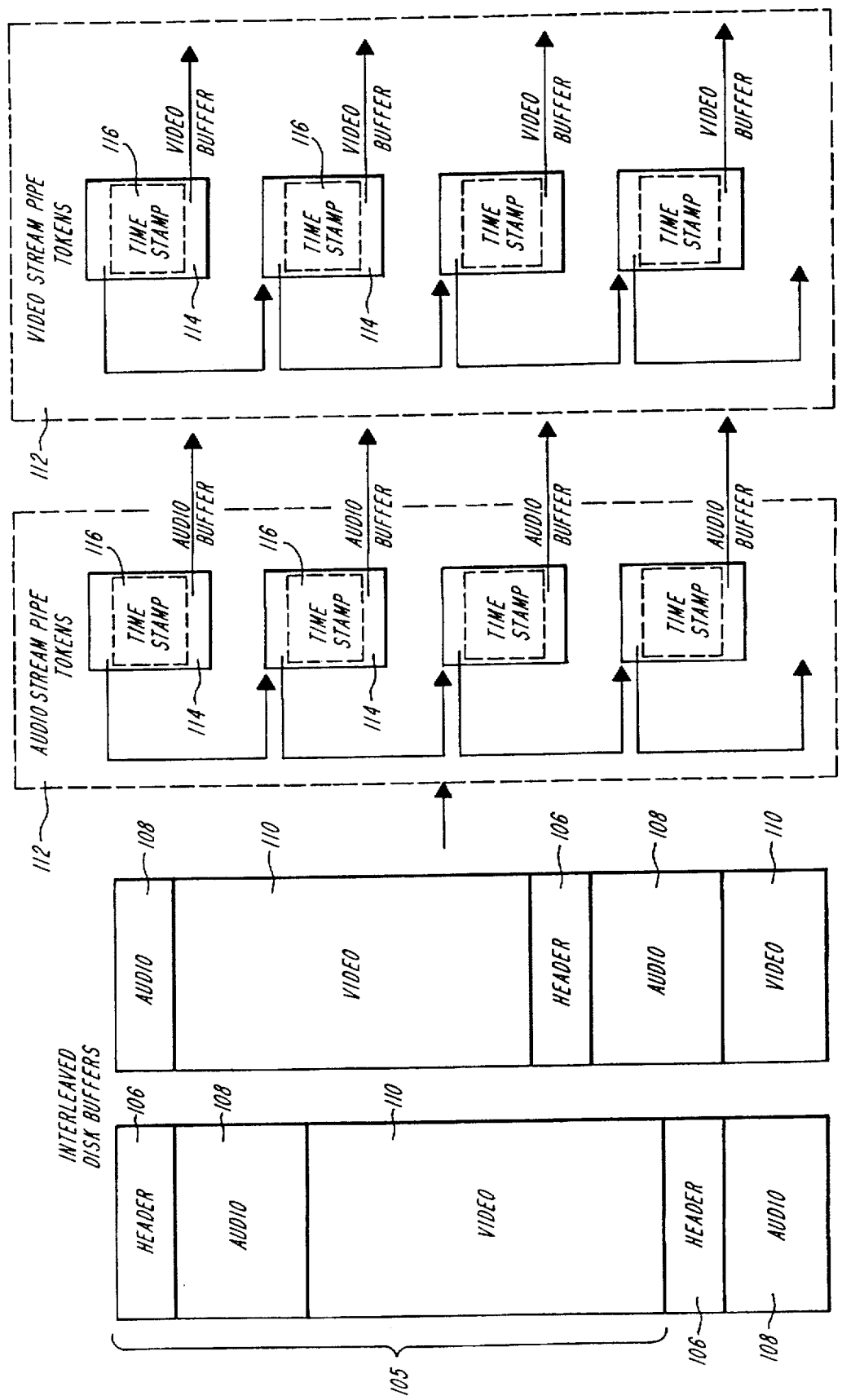
FIG. 7 is a schematic illustration of the translation from media stream storage format to token format carried out by the local digital video management system manager of FIG. 4.

Referring also to FIG. 7, the I/O manager streams translation 42 from storage representation to stream token representation is as follows. Typically, audio and video data is stored in an interleaved fashion on a disk and so upon retrieval are in an interleaved disk buffer, as in the Intel® AVSS file format. The disk buffers 100 consist of a sequence of stream group frames 105, each frame containing a header 106, a video frame 108, and an audio frame 110. A separate index table (not shown) containing the starting addresses of these stream group frames is maintained at the end of a file containing these frames. This index table permits random access to specifically identified stream group frames.

The disk buffers are retrieved by the I/O manager from the disk in large chunks of data, the size of each retrieved chunk being optimized to the disk track size, e.g., 64K bytes each. The I/O manager examines each retrieved stream group frame header and calculates the starting addresses of each audio and video frames within the stream group frame. It also retrieves the time stamp information from the corresponding frames. A linked list of descriptors, called tokens 112, is then generated for the audio and video frames; each token represents an audio or video presentation unit 114 and the time stamp 116 for that unit. These tokens are continuously linked into a list representing the stream pipe. Thus, in the process described above, the stream I/O manager retrieves interleaved data from a disk, separates the data into distinct streams, and constructs an internal representation of separated streams based on separate stream pipes, one for each stream.

Once the streams are enqueued in the stream pipes, the stream interpreter 28, having been initialized 36 by the stream controller 24, accepts and dequeues 48 the constituent stream tokens of presentation units. The debuffered streams are then scaled 50 and synchronized 52, based on control via the stream controller, which maintains 54 the status of the stream group. The scaling process will be described in detail below. The synchronized streams are then delivered to the digital presentation subsystem hardware.

The decompression scheme is based on the particular compression format of video frames, e.g., the motion JPEG video format. This format is one of a preferred class of video formats, in which each frame is intracoded, i.e., coded independently, without specification of other frames.

Figure 8:
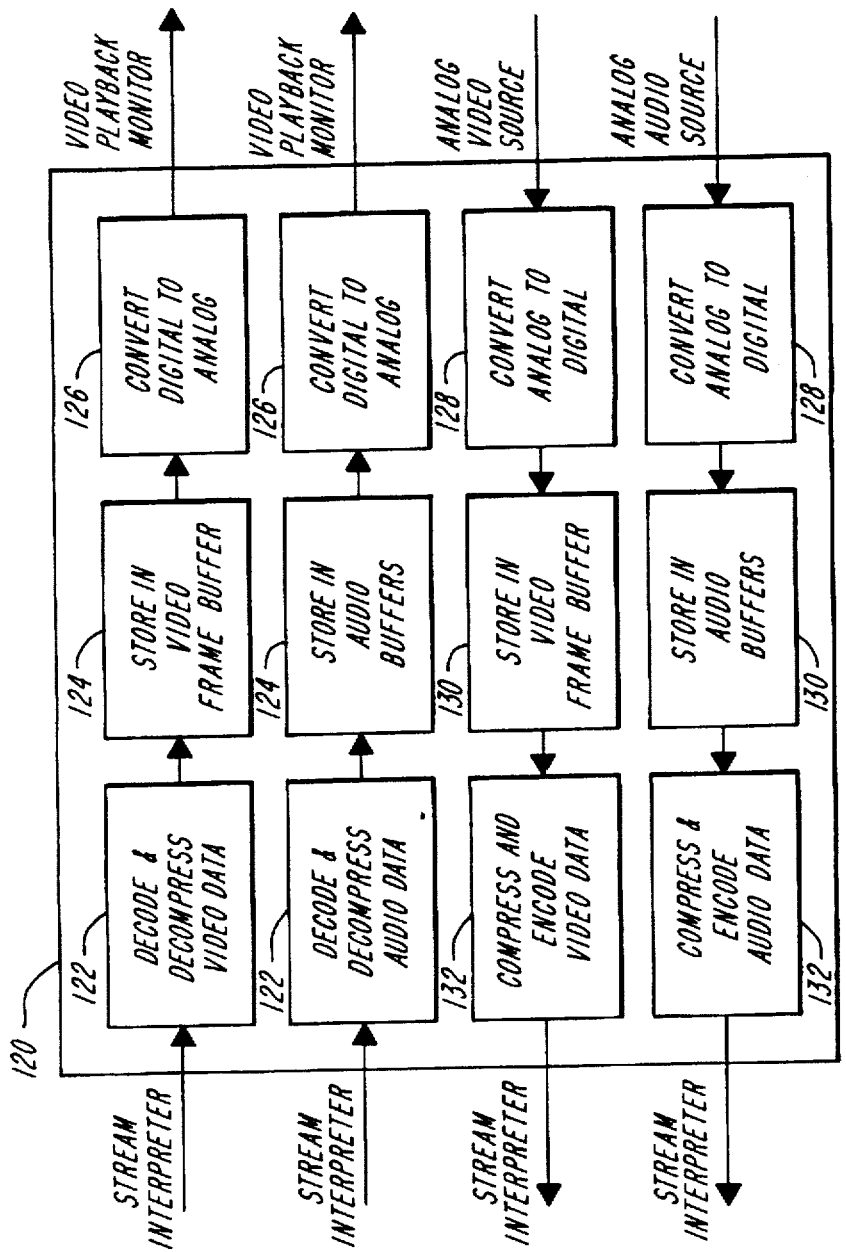
FIG. 8 is a schematic flow chart illustrating presentation and capture scenarios carried out by a digital video system used in conjunction with the local digital video management system manager scenarios of FIG. 6.

Referring to FIG. 8, the digital video system 120 receives streams from the stream interpreter and first decodes and decompresses 122 the stream data, each stream being processed separately. The decoded and decorepressed data streams are then stored 124 in corresponding frame buffers, e.g., video and audio frame buffers. At the appropriate time, the stored data is converted 126 from its digital representation to a corresponding analog representation, and is delivered to a playback monitor and audio speakers. The various operations of the digital hardware subsystem are controlled by the stream interpreter via digital video primitives, as explained and described previously.

In the reverse operation, i.e., capture and storage of digital video and audio streams being processed by a computer system, the stream interpreter 28 captures the audio and video streams from the digital hardware subsystem 120. Before this capture, the hardware subsystem digitizes 128 the audio and video signals, stores 130 the digitized signals in a buffer, and before passing the digitized streams to the stream interpreter, compresses and encodes 132 the video and audio data.

Based on the stream group control provided by the local stream controller, the stream interpreter generates 62 time stamps for the captured streams and using the time stamps, creates 64 corresponding stream tokens of video and audio presentation units with embedded time stamps. The stream tokens are then enqueued 66 to stream pipes 32 for consumption by the stream I/O manager 26.

The piped streams are accepted and dequeued 72 by the stream I/O manager 26, and then scaled. If the streams are to be stored in interleaved form, they are then interleaved 76, in a process which reverses the functionality depicted in FIG. 7. The streams are not required, of course, to be stored in such an interleaved form. Once the streams are interleaved, if necessary, the streams are stored in a corresponding storage container 30.

Each of the functions of the stream controller, stream I/O manager, and stream interpreter described in these scenarios may be implemented in hardware or software, using standard design techniques, as will be recognized by those skilled in the art. Appendices A, B, and C present a pseudocode scheme for the interactions between the stream controller, stream I/O manager, and stream interpreter in retrieving and presenting streams. The coding of the pseudocode process steps into computer instructions suitable to carry out the described scenario will be understandable to one having ordinary skill in the art of C programming.

Synchronization of Audio with Video

As mentioned in the presentation process described above, the digital video management system of the invention provides synchronization of audio to video, and in general, synchronization between any two or more dynamic stream being presented. This synchronization function is inherently required for the coordinated presentation of multiple real-time, continuous, high data-rate streams in a stream group. For example, the real-time nature of audio and video is derived from the presentation attributes of these dynamic data types, which have quite different presentation attributes; full motion video needs to be presented as 30 frames per second and high quality audio needs to be presented at 32,000 samples per second.

Furthermore, digital video and audio data streams have real-time constraints with respect to their presentation. The streams are usually continuous and last from 30 seconds-long (clips) to 2 hours-long (movies). Additionally, the streams typically consume from about 1 Mbit/sec to 4 Mbit/sec of storage capacity and transmission bandwidth, depending on the particular compression technology used for digitizing the stream. Thus, synchronization of differing data streams must accommodate the diverse temporal aspects of the streams to be synchronized.

The synchronization capability of the digital video management system of the invention is based on self-timing, and accordingly, self-synchronization, of data streams to be synchronized. This technique accommodates independent handling of multiple data streams which are together constituent streams of a stream group, even if the stored representations of the constituent stream are interleaved; the stream I/O manager separates interleaved streams before the stream interpreter synchronizes the streams. Alternatively, independent constituent streams may, however, be stored in separate file containers and be synchronized, before presentation, with a common reference time base.

Self-synchronization also provides the ability to prioritize one constituent stream over other streams in a stream group. For example, an audio stream may be prioritized over a video stream, thereby providing for scalable video storage, distribution and presentation rates, as discussed below. This feature is particularly advantageous because human perception of audio is much more sensitive than that of video. For accurate human perception of audio, audio samples must be presented at a smooth and continuous rate. However, human visual perception is highly tolerant of video quality and frame rate variation; in fact, motion can be perceived even despite a wide variation in video quality and frame rate. Empirical evidence shows that humans can perceive motion if the presentation rate is between 15 and 30 frames/sec. At lower frame rates motion is still perceivable, but artifacts of previous motions are noticeable.

The DVMS of the invention exploits this phenomenon to optimally utilize available computing, compression and network resources; by prioritizing the retrieval, transmission, decompression and presentation of audio over video within a computer system or network computing environment, and by relying on audio-to-video synchronization before presentation, rather than at storage, an acceptable audio rate can be maintained while at the same time varying the video rate to accommodate resource availability in the system or network. Additionally, independent management of audio and video data streams provides many editing capabilities, e.g., the ability to dynamically dub a video stream with multiple audio language streams. Similarly, the synchronized presentation of an audio stream with still pictures is provided for by the independent stream management technique. It must be remembered that all of the synchronization schemes described are applicable to any type of stream, not just audio and video streams.

As described above with reference to FIG. 6, the synchronization of streams within a stream group is the responsibility of the stream interpreter module during a scaling process. The streams may be self-synchronized using either an implicit timing scheme or an explicit timing scheme. Implicit timing is based on the fixed periodicity of the presentation units in the constituent streams of a stream group to be synchronized. In this scheme, each presentation unit is assumed to be of a fixed duration and the presentation time corresponding to each presentation unit is derived relative to a reference presentation starting time. This reference starting time must be common to all of the constituent streams. Explicit timing is based on embedding of presentation time stamps and optionally, presentation duration stamps, within each of the constituent streams themselves and retrieving the stamps during translation of streams from the storage format to the token format. The embedded time stamps are then used explicitly for synchronization of the streams relative to a chosen reference time base.

Using either the implicit or explicit timing self-synchronization schemes, a reference time base is obtained from a reference clock, which advances at a rate termed the reference clock rate. This rate is determined by the reference dock period, which is the granularity of the reference clock ticks.

The DVMS of the invention supports two levels of self-synchronization control, namely, a base level and a flow control level. Base level synchronization is applicable to stream process scenarios in which the stream I/O manager is able to continuously feed stream data to the stream interpreter, without interruption, and in which each presentation unit is available before it is to be consumed. In this scenario, then, the stream I/O manager maintains a process rate and a process work load that guarantees that the stream I/O manager stays ahead of the stream interpreter.

The flow control level of synchronization is a modification of the base level scheme that provides a recovery mechanism from instantaneous occurrences of computational and I/O resource fluctuations which may result in the stream pipe between the stream I/O manager and the stream interpreter running dry. This could occur, for example, in a time-shared or multi-tasked computer environment, in which the stream I/O manager may occasionally fall behind the stream interpreter's demand for presentation units due to a contention, such as a resource or processor contention, with other tasks or with the stream interpreter itself. In such a scenario, the DVMS of the invention augments the base level of synchronization with a stream flow control function, as described below.

Base Level Implicit Timing Synchronization

As explained above, the base level synchronization scheme assumes that there is no need for control of stream flow to the stream interpreter, and thus does not monitor for vacancy of the stream pipe. Implicit timing is based on a reference time base that is applied to each stream to be synchronized.

Considering a scenario in which audio and video streams are to be synchronized, each presentation unit for the video stream to be presented might typically contain video information to be presented in a frame time of, e.g., 33 msec, for NTSC video play. The audio stream might typically be divided into fixed frames of presentation time with marginally varying samples per presentation unit. In a storage scheme in which the audio and video are interleaved, these fixed units of time are set as the time duration for a video frame, i.e., 33 msec.

In this synchronization scenario, the stream interpreter maintains a separate presentation unit counter for each stream pipe, and correspondingly, for each stream in the stream group. The interpreter consumes presentation units from the two streams in a round robin fashion, i.e., first one, then the other, and so on. Importantly, an independent presentation synchronization decision is made for each presentation trait, or token, of each stream, based on a corresponding reference time base, without regard to other streams. This reference time base indicates the current real time relative to the start time of the presentation unit consumption process for the corresponding stream. The stream counter of each stream pipe indicates the number of already consumed presentation units in the corresponding stream. Multiplying this count by the (fixed) duration of each of the presentation units specifies the real time which has elapsed to present the counted units. When this real time product matches the current reference time, the next presentation unit is released for presentation.

The stream interpreter initiates the consumption and presentation of each presentation unit in sequence during its presentation process cycle based on the presentation decision scheme given in pseudocode in Appendix D. This scheme implicitly assumes that the stream interpreter is scheduled such that the interpreter process rate is very close to the nominal presentation rate of the corresponding stream. This scheme is based on a comparison of a reference time base with the amount of time required to present the number of already-consumed presentation units, and thus requires the use of counters to keep a count of presentation units as they are consumed.

Base Level Explicit Timing Synchronization

As explained previously, in the explicit timing scheme, stream synchronization is based on time stamps that are embedded in the corresponding streams' tokens themselves. The time stomps represent the time, relative to the reference time base, at which the corresponding audio or video presentation frames are to be consumed and presented. The time base may be, for example, an external clock, or may be generated from the embedded time base of one of the streams to be synchronized. The periodicity of the time stamps is itself flexible and can be varied depending on particular synchronization requirements. Time stamps may be embedded in the streams during capture and compression operations, as described above, or at a later time during, for example, an editing process. Independent of the process by which the time stamps are embedded in a stream, the stamps are utilized by the stream I/O manager and interpreter during playback processes to make the consumption and presentation decisions. The stream interpreter does not maintain a presentation unit counter in this scheme, as it does in the implicit timing scheme. Rather, the embedded time stamps in the streams provide equivalent information.

A time stamp for a presentation frame token consists of two 32-bit integers representing the presentation time and the presentation duration for that presentation unit. The presentation time and the presentation duration are represented in milliseconds. The presentation duration may be omitted if all presentation units are of the some duration.

In this synchronization scheme, the interpreter reads the embedded time stamp of each presentation token, as that token is processed, to determine presentation time and duration for each presentation unit in the sequence. The interpreter decides on consumption and presentation of each presentation unit in each stream based on the decision scheme given in pseudocode in Appendix E. This decision scheme is based on the assumption that the stream interpreter is scheduled such that its process rate is very close to the nominal presentation rate of the corresponding stream. This scheme is based on a comparison of a reference time base with the presentation time and presentation duration stamp embedded in each presentation unit. When a presentation unit's stamp presentation time corresponds to the reference time, that presentation unit is consumed for presentation.

In addition to determining the appropriate time for releasing presentation units in the sequence, both the implicit and explicit timing schemes delete presentation units if the appropriate release time for those units has passed. For example, in the implicit timing scheme, when the product of processed units and unit duration exceeds the currently maintained time count, the next sequential unit is deleted, rather than presented. Similarly, in the explicit timing scheme, then the current presentation time exceeds the time stamp presentation time of a presentation unit, that unit is deleted, rather than presented. In this way, synchronization of streams is maintained, even if units arrive for presentation at a later time than expected. The Appendices D and E give corresponding pseudocode for this presentation unit deletion function.

Flow Control Level Implicit Timing Synchronization

The flow control synchronization scheme augments the base level synchronization scheme to provide for recovery from instantaneous computational and I/O resource fluctuations during a consume and presentation process cycle. The base level scheme relied on the assumption that the stream I/O manager stays ahead of the stream interpreter to keep steam pipes from becoming vacant, or running dry. Flow control synchronization guards against this condition using a scheme based on virtual presentation units.

A virtual presentation unit is one which allows the underlying digital hardware subsystem to continue with a default presentation for the duration of a corresponding presentation unit, while at the same time maintaining a consistent internal state, to thereby provide sequential processing of a stream that is being presented, even while the stream pipe is temporarily empty. Virtual presentation units may be implemented in a variety of embodiments. For example, in the case of motion JPEG video, the playing of a virtual presentation unit would preferably correspond to redisplaying the most recent previous video frame. In the case of audio streams, a virtual presentation unit would preferably correspond to a null unit, i.e., a presentation unit consisting of null samples that represent silence. Other virtual presentation unit implementations are equally applicable.

During a presentation process cycle using the flow control implicit timing scheme to synchronize stream flow, the stream I/O manager and stream interpreter perform the same operations described above in the base level scheme. As explained, the interpreter maintains a separate presentation unit counter for each stream within the stream group being presented, to keep track of the number of already-consumed presentation units in each stream. Multiplying this count by the duration of each presentation unit specifies the time at which, when matching the reference time, the next presentation unit in the sequence is to be presented. The stream interpreter decides on the consumption and presentation of each presentation unit based on the decision scheme given in pseudocode in Appendix F, which assumes that the interpreter is scheduled at a process rate that is close to the nominal stream presentation rate. In this scheme, when the interpreter finds that a presentation token is not available from the stream pipe, and that the reference time and presentation unit count indicate that a presentation unit is needed, a virtual presentation unit is generated and consumed for presentation.

Flow Control Level Explicit Timing Synchronization

During a presentation process cycle using the explicit timing synchronization mechanism augmented with flow control capability, each presentation token in the stream group being presented is assumed to include its own embedded time stamp for presentation time and duration. As in the explicit timing scheme without flow control, the stream interpreter examines each embedded time stamp to decide on the consumption policy of the corresponding presentation unit in the stream pipes set up by the stream I/O manager. The consumption policy is determined based on the decision scheme, given in pseudocode in Appendix G, which assumes, as did the other schemes, that the process rate of the stream interpreter is close to the nominal presentation rate of the corresponding stream. In this scheme, when it is determined that another presentation unit is not available from the stream pipe and a unit should be presented, a virtual presentation unit is generated based on a default presentation duration, and that unit is then consumed for presentation.

Additionally, in the flow control schemes of either implicit or explicit timing, capability is provided to skip over presentation units. This capability is envoked whenever a previously unavailable presentation unit later becomes available. In the explicit timing scheme, the time stamp of a later available unit will never match the reference time after the presentation of a virtual presentation unit, and thus that unit will never be presented, and will be discarded. In the implicit timing scheme, the presentation of a virtual presentation unit in place of an unavailable presentation unit advances the presentation unit counter, as does any presented unit. When the unavailable unit is then later available, the presentation unit count will be advanced such that the product of the count and the fixed presentation unit duration will not permit presentation of that unit.

Coding of the four synchronization processes described above and in Appendices D-G into instructions suitable for implementing the synchronization techniques will be understandable to those having ordinary skill in the art of C programming.

Self-Synchronization Features

The four self-synchronization schemes described above provide several critical advantages in the digital video management scheme of the invention. Self-synchronization accommodates the ability to dynamically associate distinctly stored streams with a common stream group. Thus, for example, audio and video streams may be stored in separate file containers and grouped dynamically during retrieval from storage for synchronized presentation. As discussed above, this synchronization of constituent audio and video streams provides, for example, for the function of dubbing of video with audio, and synchronizing still video with audio. Additionally, using the stream synchronization technique, stream segments from different file containers can be dynamically concatenated into one stream. In the case of explicit self-synchronization, the stream I/O manager marks the first presentation unit in a stream segment with a marker indicating the start of a new stream segment. Then when the stream interpreter consumes this presentation unit, the interpreter reinitializes the reference time base for the corresponding stream.

Self-synchronization further accommodates the ability to adapt to skews in the clock rates of audio and video hardware used to play audio and video streams which are being synchronized. For example, an audio stream recorded at an 11, 22 or 33 KHz sampling rate must be played back at exactly the sampling rate for accurate audio reproduction. Similarly, a video stream recorded at 30 frames per second must be played back at that same rate. The audio and video hardware playing these streams thus must each use clocks adapted for the particular play rate requirement of the corresponding stream. Any skew in the clock rates would cause drifting of the playing streams, and thus destroy synchronization of the streams, if the skew were to be uncorrected. Self-synchronization achieves this correction automatically using a reference time base which the audio and video time bases are checked against; the consumption rate of a stream is adjusted to drop presentation units periodically, if necessary, if a skew in one of the time bases, relative to its prescribed correspondence with the reference time base, is detected, thereby maintaining synchronization with respect to the reference time base and the other stream.

The self-synchronization schemes provide the capability to vary the inherent presentation rate of streams. For example, a video stream captured in PAL format, based on 25 frames per second, may be played in the NTSC format, which is 30 frames per second, albeit with some loss of fidelity. In general, any stream may be played at a custom rate, independent of the rate at which the stream was captured. In fact, it is often desirable in video playback to either speed up or slow down the nominal presentation rate of the video. Using the self-synchronization technique, the video presentation rate may be, for example, sped up by a factor of 2 by simply advancing the reference time base to twice the real time rate. Conversely, the presentation may be slowed by half by advancing the reference time base at one half the real time rate. In these cases, the total time elapsed for the presentation will be, of course, one half or twice the elapsed time for the presentation made at the nominal rate.

Stream Scalability

A scalable stream is a stream that can be played at an aggregate nominal presentation rate with variable data rates, under computer control. Of course, variation in the data rate may affect the quality, fidelity or presentation rate of the stream. The coupling of stream scalability with stream self-synchronization provides a powerful control mechanism for flexible presentation of audio and video stream groups.

As discussed above, scalability allows the DVMS to optimize utility of computer system resources by adjusting stream rates according to utility availability. In the case of audio and video streams, the stream interpreter may be programmed to give higher priority to audio streams than video streams, and thus consume audio presentation units at the nominal audio presentation rate, but consume video units at an available presentation rate. This available presentation rate is determined by the available computational resources of a given computer system. Different computer systems having varying performance characteristics require differing amounts of time to accomplish presentation operations. Such operations involve decompression, format conversion and output device mapping. In particular, a compressed Motion JPEG video stream has to be Huffman decoded, DCT decompressed, converted to RGB color space, and mapped to a 256 color VGA palette by the digital hardware subsystem before presentation within an IBM PC-compatible personal computer system; different computer systems require various time periods to accomplish these tasks. Thus, the management system of the invention adapts to any computer performance characteristics by adjusting the scale of the stream flow rate to accommodate the availability of utilities in that computer.

Most importantly, the stream scalability feature of the digital video management system of the invention provides the ability to comprehensively manage distribution of digital streams over packet networks. The DVMS exploits this capability in a network embodiment providing management protocol schemes for client-server sessions, as well as management protocol schemes for storing, accessing, retrieving and presenting streams over a LAN or WAN. The system thereby accommodates on-demand retrieval and playback of stored streams, and injection and tapping of multicast live streams over packet networks. The managed digital streams may be stored in ordinary computer files on file servers, or may be generated from live analog sources and made accessible over a LAN or WAN. Such access may be on-demand, as mentioned above, as in retrieval and presentation from a stored file, or on-schedule, as in injection and tapping from a broadcast channel. The management protocol schemes provided by the DVMS will be fully described below.

Figure 9:
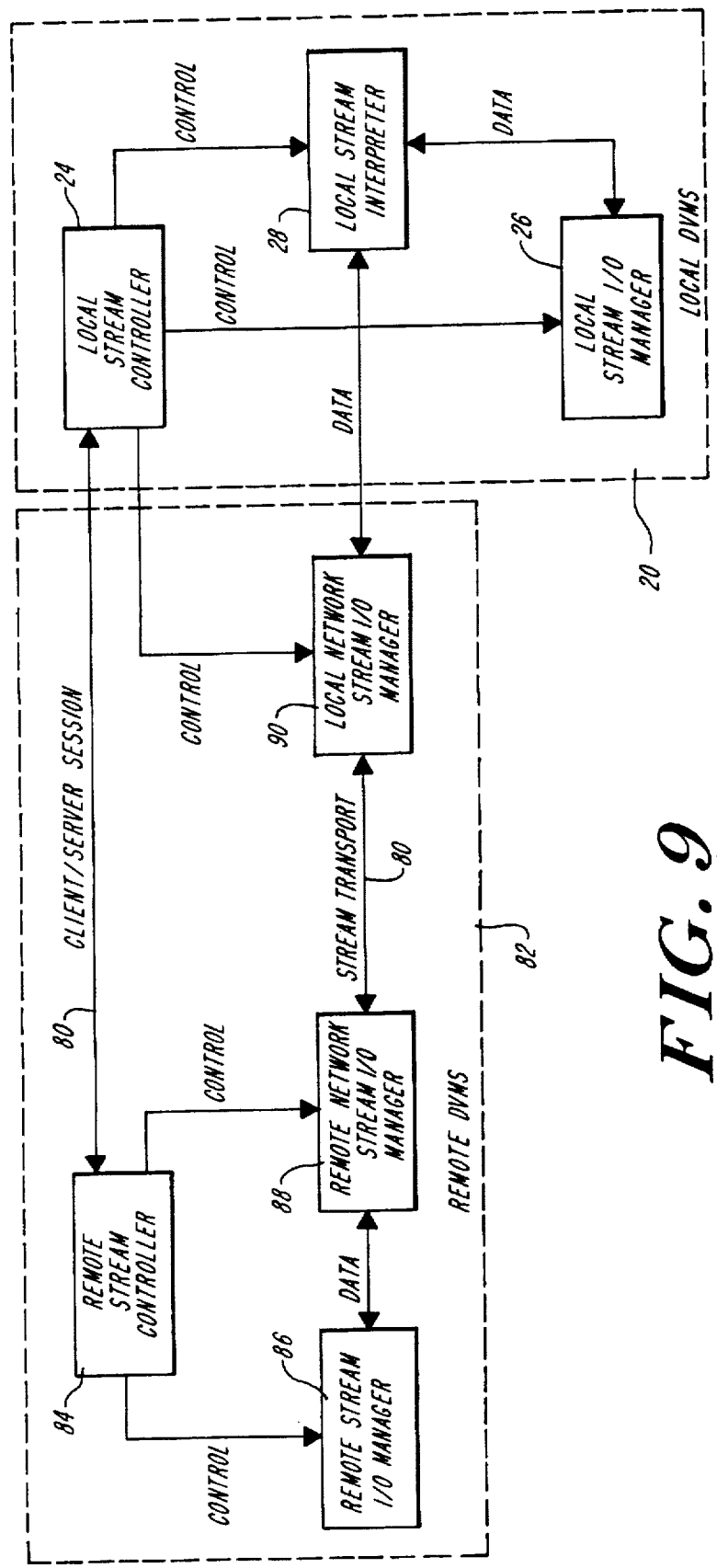
FIG. 9 is a schematic diagram of the local digital video management system manager and the remote digital video management manager modules of the invention in a network implementation.

Referring now to FIG. 9, in a network implementation, the local DVMS manager 20 accesses digital media stream located elsewhere in the network via the remote DVMS manager 82 of the management system; the local DVMS manager provides a client operating environment, while the remote DVMS manager provides a network operating environment. Via the network 80, the local DVMS manager 20 and the remote DVMS manager 82 transmit control messages and digital media data streams as they are requested by a computer client connected in the network.

Remote DVMS Manager

The remote DVMS manager 82 manages network control of digital media streams via four independent modules, namely, a remote stream controller 84, a remote stream input/output (I/O) manager 86, a remote network stream I/O manager 88, and a local network stream I/O manager 90.

In this DVMS network implementation, the local DVMS manager 20, residing locally to a client computer in the network, comprises a local stream controller 24, local stream I/O manager 26 and local stream interpreter 28. The local network stream I/O manager 90 of the remote DVMS manager directly interfaces with the local DVMS manager locally.

The remote stream controller 84 resides on a remote storage device or access point, e.g., a video server, in the network. This controller is responsible for managing the remotely stored streams, e.g., video files, and thereby making them available for on-demand access by the local stream controller module of the local DVMS manager. Client-server session management protocols control this access. The remote stream controller also provides a link for feedback control from the local DVMS manager to the remote DVMS manager, as described below.

The remote stream I/O manager 86 also resides on a remote server; it is responsible for dynamically retrieving and storing streams from or to a storage container in the remote storage server. Efficient access to stored stream information and handling of file formats is provided by this module. Thus, the remote stream I/O manager performs the same tasks as those performed by the steam I/O manager of the local DVMS manager in a stand-alone computer implementation—tasks including translation between stored stream representations and corresponding dynamic computer-based token representations.

The remote network stream I/O manager 88, implemented on a remote server, regulates transmission of streams across the network to and from a local DVMS manager with which a communications session has been initiated. This transmission comprises stream exchange between the remote network stream I/O manager 88 and the local network stream I/O manager 90, which resides locally with respect to the local DVMS manager modules, on a client in the network. Stream transport protocols control the transmissions. The local network stream I/O manager 90 receives streams from the network and delivers them to the local DVMS stream interpreter 28 during playback processes; conversely, it receives streams from the local stream interpreter and transmits them over the network during recording and storage processes.

The DVMS of the invention provides protocols for managing the interaction and initialization of the local DVMS manager modules and the remote DVMS manager modules just described. Specifically, four classes of protocols are provided, namely, access protocols, for stream group naming and access from a stream server or injector; transport protocols, providing for stream read-ahead, and separation and prioritization of streams; injection/tap protocols, providing the capability to broadcast scheduled streams, e.g., video streams, to selected network clients; and feedback protocols, accommodating the management of adaptive computational resources and communication bandwidths.

When the DVMS is configured in a network environment, remote media data stream file servers in the network advertise the stream groups controlled in their domain based on a standard network advertisement protocol. For example, in the Novell® Netware™ environment, servers advertise based on the Service Advertisement Protocol (SAP). Each video server is responsible for a name space of stream group containers that it advertises.

As shown in FIG. 9, when an application running on a computer (client) connected in the network opens a stream group container by name to access the container contents, the DVMS initializes the corresponding local stream controller 24 of the local DVMS manager to access the corresponding stream group. The local stream controller then sets up a client-server session with the appropriate remote stream controller 82 based on the stream group container name that the application wishes to access and the remote server's advertisement. The local stream controller may access multiple stream group containers during a single session. This capability results from the name service architecture employed by the remote DVMS manager. In this scheme, a domain of container names is accessed via a single access call, whereby multiple containers in the domain are simultaneously available for access.

The local stream controller 24 then initializes the local network stream I/O manager 90 of the remote DVMS manager, and commences a stream read-ahead operation, described below, with the appropriate remote stream controller 84. In turn, that remote stream controller initializes the corresponding remote stream I/O manager 86 and remote network stream I/O manager 88 to handle retrieval and transmission of the constituent streams within the accessed stream group.

The stream read ahead operation is employed to reduce latency perceived by a client when a stream group presentation is begun; stream retrieval, transmission, and scaling require a finite amount of time and would be perceived by a client as a delay. In the read ahead operation, the remote stream I/O manager, the remote network stream I/O manager, and the local network stream I/O manager retrieve, transmit, and scale the streams at the very start of a client-server session, even before the client requests stream presentation. In this scheme, the stream are ready for immediate consumption by the local stream interpreter, via the stream pipes, whenever a user specifies the start of presentation, and possible presentation delays are thereby eliminated or minimized.

Figure 10:
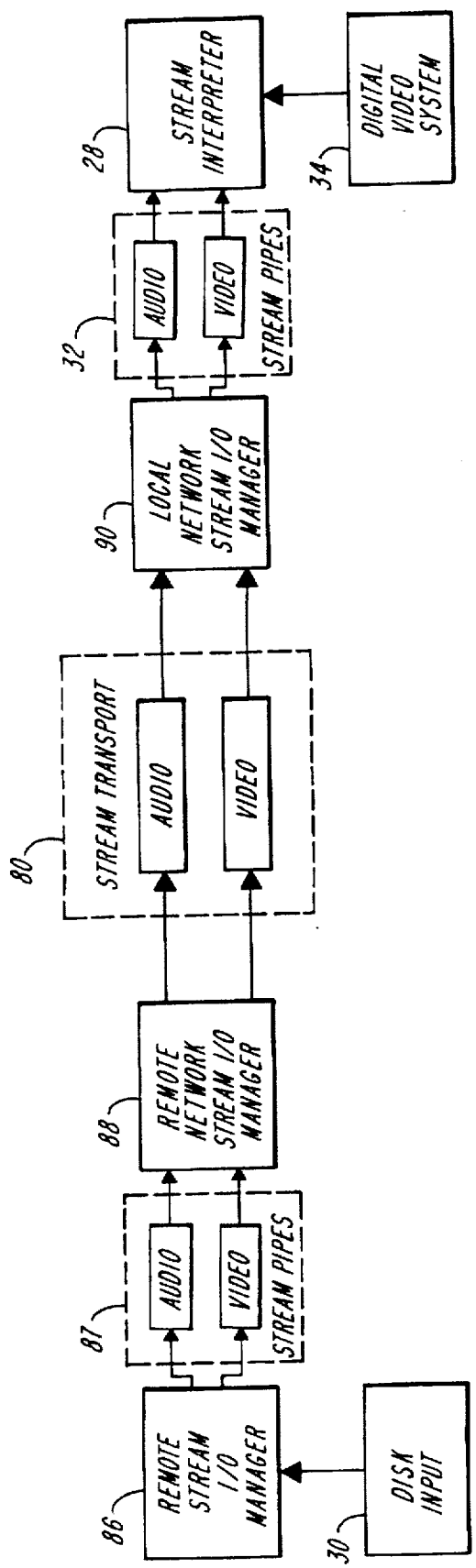
FIG. 10 is a schematic diagram illustrating the flow of media stream data between the remote and local digital video management manager modules of the invention in a network implementation.

Referring now to FIG. 10, when a network client requests access to a specified stream group, the following procedure is implemented. Upon initialization from the request, and based on the network servers' stream group advertisements, the appropriate remote stream I/O manager 86 retrieves stored streams, e.g., audio and video streams, from the appropriate file storage 30 containing the requested stream group. The manager then separates the retrieved streams, if necessary, thereby producing separate audio and video presentation unit streams, and enqueues corresponding stream descriptor tokens in separate stream pipes 87, one pipe for each presentation unit token stream.

The remote network stream I/O manager 88 consumes the presentation unit tokens from each of the stream pipes, assembles transmission packets based on the streams, and releases them for transmission across the network 80 directly to the corresponding local network stream I/O manager 90, based on the DVMS stream data transport protocols; the particular transport protocol used is set by the network environment. For example, in a Novell® network, the Netware SPX protocol is used for stream data transport. The local network stream I/O manager 90, upon receipt of the transmitted presentation units, queues the presentation units in separate stream pipes 32 for each stream to be consumed by the local stream interpreter 28 for use by the client computer's digital media hardware subsystem 34.

Figure 11A:
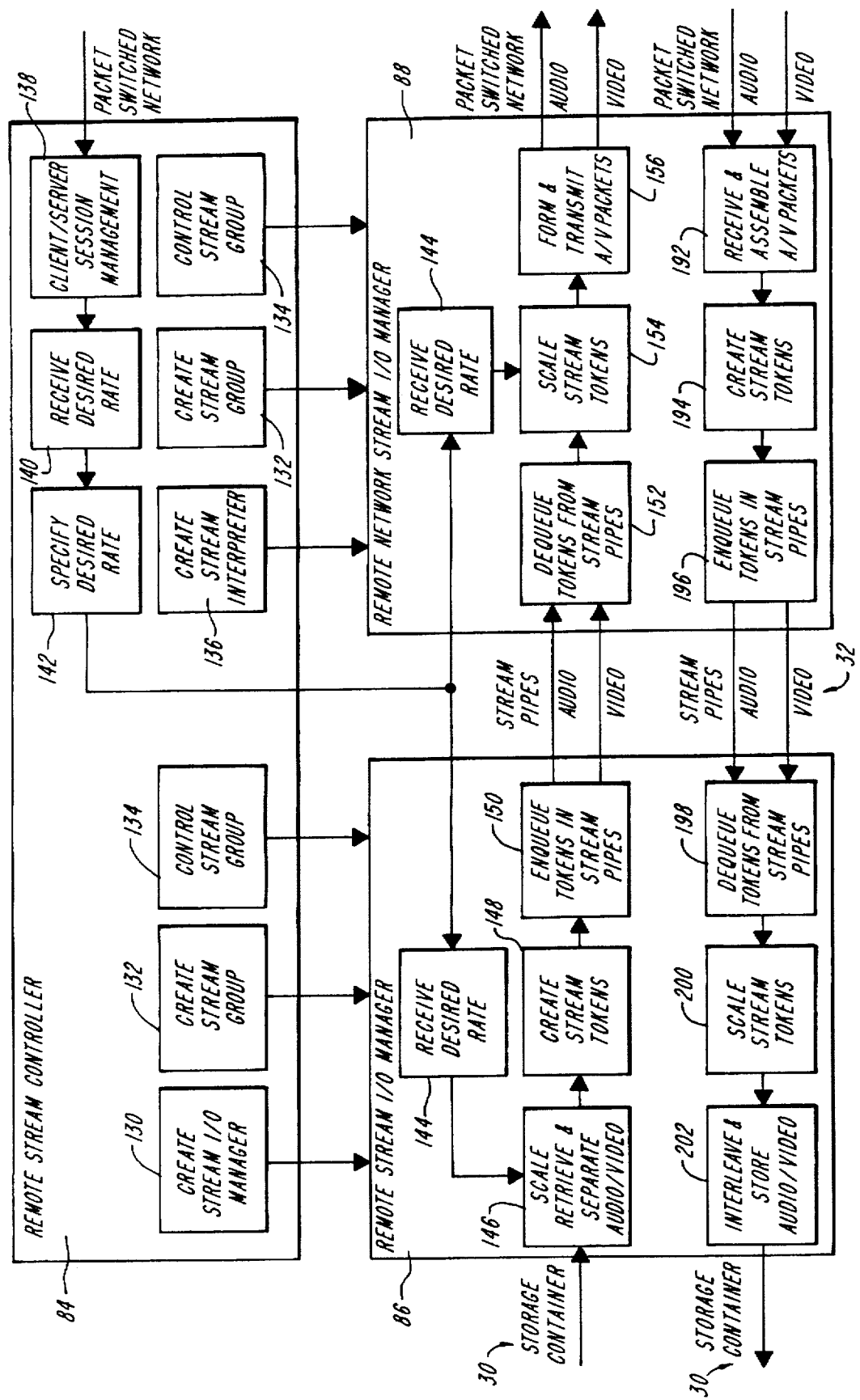
FIG. 11A is a schematic flow chart illustrating presentation and capture scenarios carried out by the remote digital video management system manager of FIG. 9.

Referring to FIG. 11A, illustrating the remote DVMS functions in more detail, upon initialization, the remote stream controller 84 initializes the remote stream I/O manager 86 and the remote network stream I/O manager 88 by creating 130, 136 active modules of each of the managers. It also specifies 132 the requested stream group for access by the two managers. Control 134 of the specified stream group is provided throughout the duration of the managers' functions.

The remote stream controller 84 also provides management 138 of the client/server session which proceeds between the local and remote DVMS systems as a result of the stream group request. Based on information provided by the local DVMS manager which requested the stream group, the remote stream controller receives 140 a desired rate value from the local DVMS; this rate value indicates the rate at which the streams are to be presented, and is explained more fully below. The remote stream controller specifies 142 this rate to each of the remote stream I/O manager 86 and the remote network stream I/O manager 88, which each receive 144 the rate.

The remote stream I/O manager 86 retrieves, separates, and scales 146 audio and video streams from the appropriate stream container 30. If the streams were stored separately, rather than interleaved, the streams may be individually scaled at this point, while if the streams were interleaved, the remote network stream I/O manager 88 later scales the streams, as explained in detail below.

In a process explained previously with reference to FIG. 7, the remote stream I/O manager creates 148 stream tokens corresponding to the stream presentation unit frames retrieved from storage, and enqueues 150 the stream tokens for delivery to the remote network stream I/O manager via individual stream pipes 32.

The remote network stream I/O manager 88 dequeues 152 the tokens from the stream pipes and if necessary, scales 154 the tokens. The tokens are then formatted 156 for transmission packets, and released to the network for transmission.

Figure 12:
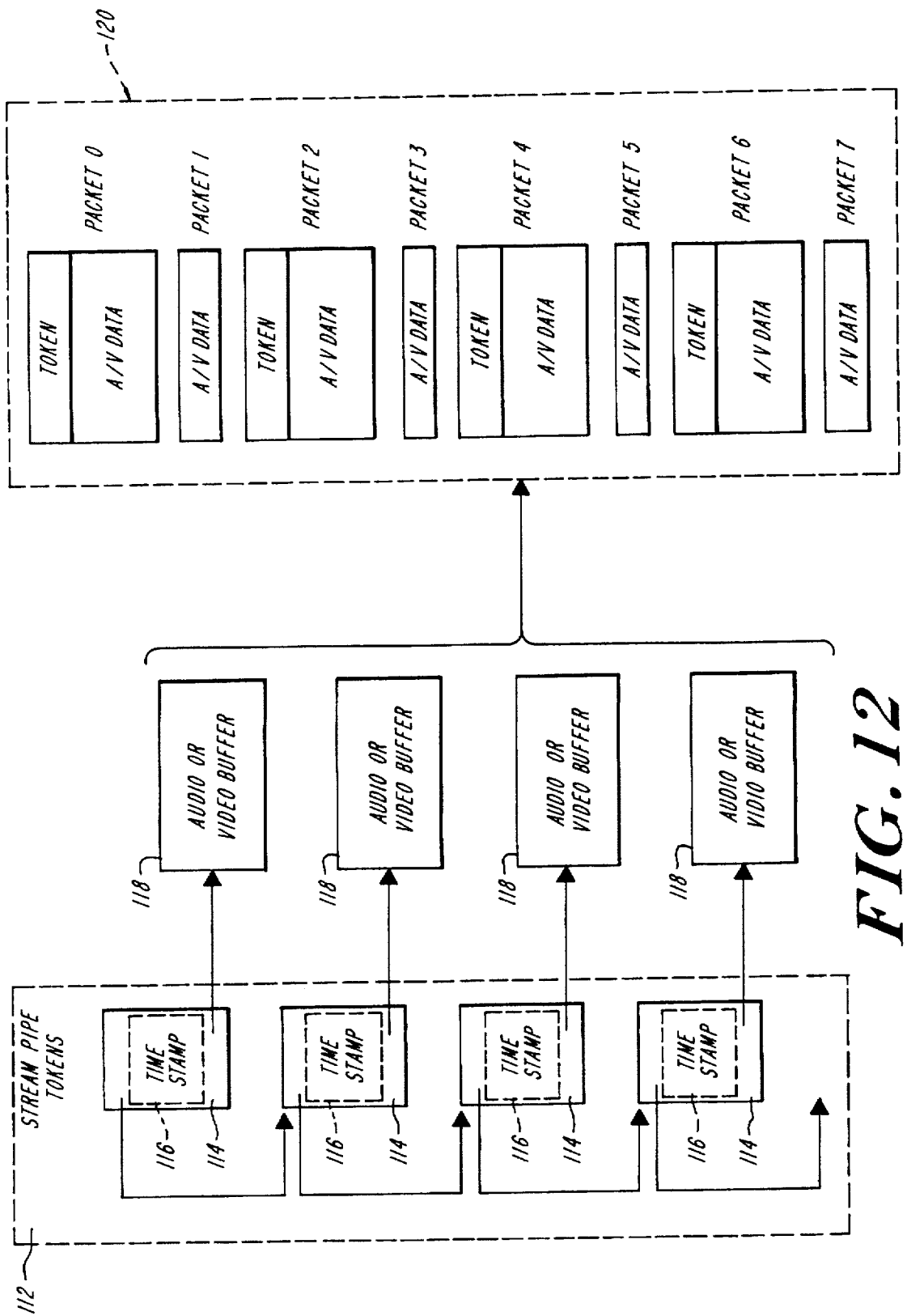
FIG. 12 is a schematic illustration of the translation of stream tokens of FIG. 7 into packet format.

Referring also to FIG. 12, the packet format process 156 is implemented as follows. Each token 114 in the token streams 112 is enqueued in a buffer 118, whereby each buffer contains tokens and associated media frame data from one stream only, even if the streams were originally interleaved in storage. Tokens, along with corresponding media data from the buffers, are then sequentially ordered in packets 120 in such a manner that each token and the corresponding media data remain associated. This association, along with the fact that tokens are likely to be time stamped, does not require that the storage format and congruency of the stream be preserved in the transmission packets during transmission.

This packet format scheme provides dramatic advantages over the conventional packet format scheme of the prior art. In the conventional packet protocol the stored media data format, which is typically interleaved, is preserved in the transmission packet format. Thus, in this scheme, audio and video streams are transmitted across a network in packets containing a sequence of interleaved headers, audio frames, and video frames, and thus, the specific syntax by which the interleaved streams were stored is replicated in the packet format.

In contrast, in the packet format scheme of the invention, the separation of streams and distinctly formatting of packets for each stream provides an opportunity and the facility to examine, process, and make transmission decisions about each stream and each presentation unit independent of other streams and presentation units. As a result, the local DVMS manager can make presentation decisions about a given presentation unit token independent of the other tokens in the corresponding stream, and can make those decisions "on-the-fly". This capability provides for real time scaling and network load adjustment as a stream is retrieved, processed, and transmitted across the network. The conventional prior art scheme does not have any analogous facility, and thus cannot provide the synchronization, scaling, and rate control features of the invention.

Figure 11B:
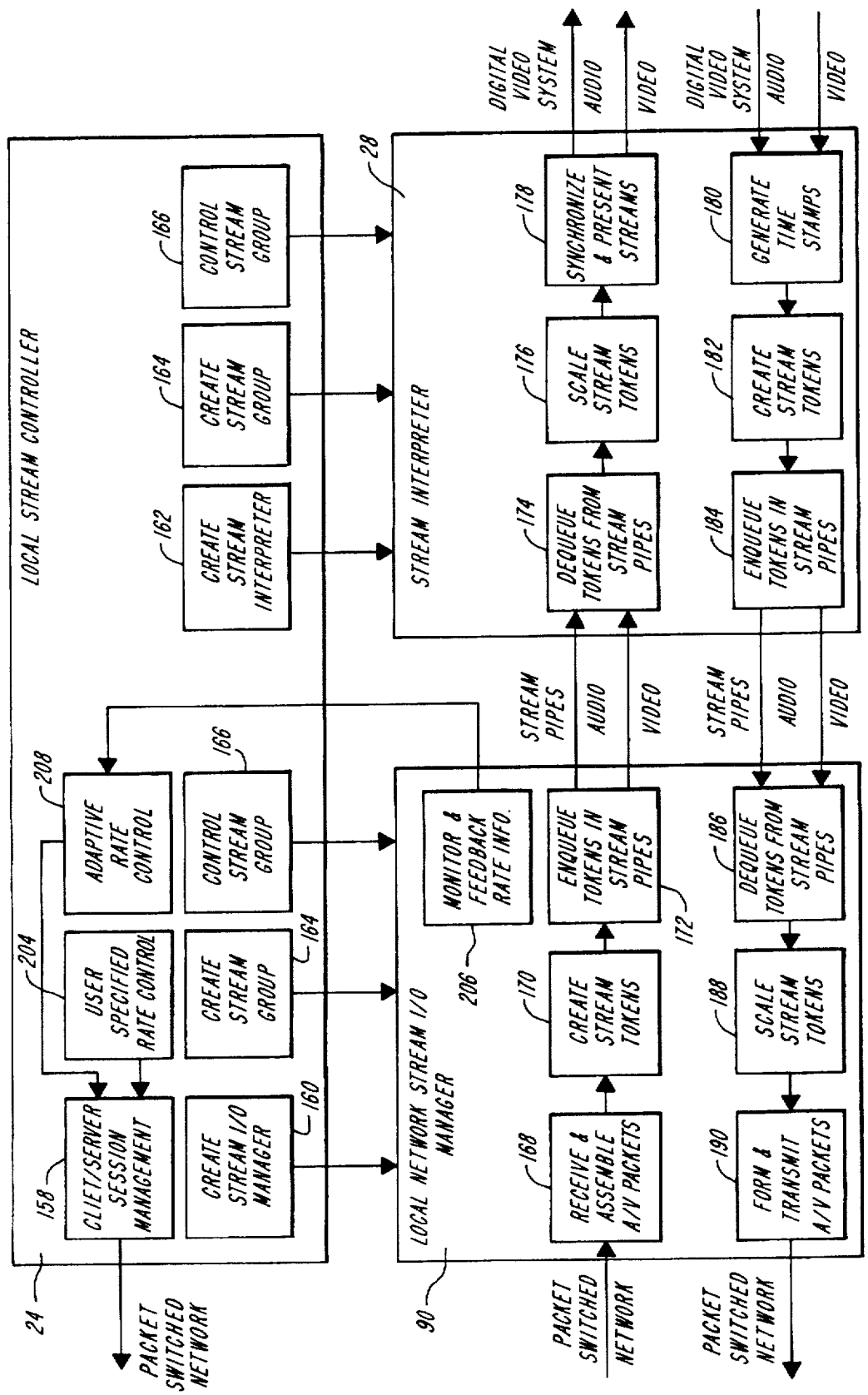
FIG. 11B is a schematic flow chart illustrating presentation and capture scenarios carried out by the local digital video management system manager of FIG. 9.

Referring to FIG. 11B, once the stream group is transmitted across the network, the local DVMS manager processes the stream group for presentation. The local stream controller 24 manages 158 the client/server session communication with the remote stream controller 84. Like the remote stream controller, it also creates 160, 162 instances of active processors, here initializing the local network stream I/O manager 90 and the local stream interpreter 28. The local stream controller creates 164 the stream grouping of interest and controls 166 that group as the local network stream I/O manager 90 and stream interpreter 28 process the group.

The local network stream I/O manager 90 receives 168 the transmitted network packets and assembles presentation units as they are received. Then it creates 170 stream tokens from the received packets and enqueues 172 them to individual stream pipes. The stream interpreter 28 dequeues 176 the tokens from the stream pipes and scales 176 the tokens as required, in a process discussed below. Then using the synchronization schemes explained previously, the streams are synchronized 178 and sent to the digital hardware subsystem for presentation. The functions of this hardware were explained previously with reference to FIG. 8.

In the reverse process, i.e., when recording streams from a network client for storage on a remote stream server, as shown in FIGS. 11A and 11B, the digital stream hardware subsystem provides to the local stream interpreter 28 the stream data, and based on the playing format of the streams, the local stream interpreter generates 180 corresponding time stamps, for use in synchronization and scaling. Stream tokens are then created 182 and enqueued 184 in the stream pipes.

The local network stream I/O manager dequeues 186 the stream tokens from the pipes and scales 188 the streams based on their play rate, record rate, and storage format, as discussed below. Then packets are formed and transmitted 190 via the network to the remote server location on which the corresponding remote DVMS exists.

Thereafter, the remote network stream I/O manager 88 receives 192 the transmitted packets and creates 194 stream tokens based on the packets. The tokens are then enqueued 196 in stream pipes for consumption by the remote stream I/O manager. The remote stream I/O manager dequeues 198 the tokens from the stream pipes, and scales 200 the streams if necessary. Finally, it interleaves the streams, if they are to be stored in an interleaved format, and stores 202 the streams in appropriate stream containers on the server.

FIGS. 11A and 11B illustrate that the network implementation of the DVMS of the invention is an elegant and efficient extension of the stand-alone DVMS implementation; this extension is possible as a result of the modularity in design of each processing entity. Specifically, the details of packet transport are transparent to the remote stream I/O manager; it functions in the some manner as a stand-alone stream I/O manager. Similarly, presentation unit token streams provided to the local stream interpreter do not contain transmission-specific formats.

As a result, the local DVMS manager, when implemented in a network environment, is easily reconfigured to provide a remote DVMS manager which includes a corresponding remote steam I/O manager, with the addition of a remote network stream I/O manager; and a local DVMS manager which includes a corresponding local stream interpreter, and a local network stream I/O manager from the remote DVMS manager. Exploiting this modularity, programming applications may be created which are supported by the DVMS functionality without them perceiving a functional difference between a local, stand-alone type stream scenario and a remote, network stream scenario.

Appendices H, I, J, and K together present a C-language pseudocode implementation of the client-server session control and remote and local stream processing techniques required in addition to those given in Appendices A, B, and C for the network implementation of the DVMS of the invention. Those having ordinary skill in the art of C programming will understand the coding of theses pseudocode processes into corresponding code. Additionally, as will be recognized by those skilled in the art, these processes may alternatively be implemented in hardware using standard design techniques to provide the identical functionality.

Scalable Stream Rate Control

In the network embodiment of the DVMS of the invention, the remote and local DVMS managers operate together to provide control of the rate of flow of streams through a network during stream transmission. As mentioned above, this capability is particularly advantageous in handling audio and video streams to accommodate fluctuations in network utility availability by prioritizing audio stream rate over video stream rate.

This priority is based on the premise that human visual perception of motion is highly tolerant of variations in the displayed quality and frame rate of presented video. Typically, humans perceive motion when a video presentation rate exceeds at least 15 frames per second. Moreover, instantaneous and smooth variations in video presentation rates are practically unnoticeable. However, human aural perception is quite intolerant of variations in audio presentation quality or rate. Typically, humans perceive noise when a constant audio presentation rate is not maintained, and perceive "clicks" when brief periods of silence are injected into an audio stream. Thus, the DVMS system prioritizes audio streams over video streams. This prioritization of audio over video extends over the entire data flow of audio and video streams in a network, starting from their retrieval from storage containers and ending with their presentation.

Control of the rate of streams through a network based on this audio prioritization scheme may be initiated automatically, or in response to a direct user request. Each type of control request is discussed below in turn. The remote DVMS manager responds to each type in the same manner, however.

Referring again to FIG. 11A, remote stream controllers 84 in the network are responsible for instructing the corresponding remote stream I/O manager 86 and remote network stream I/O manager 88 as to what percentage of the nominal presentation rate (at which the stream would "normally" be presented) the stream should be actually retrieved and transmitted. The remote stream controller receives 140 the desired rate value via network communication with the local stream controller 24 and specifies 142 this rate to the remote stream I/O manager 86 and the remote network stream I/O manager 88, which each receive 144 the rate value.

The stream rate control mechanism is carried out by either the remote stream I/O manager or the remote network stream I/O manager, depending on particular stream success scenarios. As explained above, if the requested audio and video streams are interleaved in storage, in, e.g., the Intel DVI AVSS file format, the remote stream I/O manager retrieves the streams in that interleaved form, separates the streams into distinct streams, and creates corresponding presentation unit tokens. The remote stream I/O manager does not, in this scenario, have the ability to manipulate the streams distinctly because they are retrieved interleaved. In this case, the remote network stream I/O manager, which obtains the streams from the stream pipe after they have been separated, controls the rate of each stream as before forming stream packets for network transmission.

If the streams to be retrieved are individually stored, the remote stream I/O manager may control the rate of the streams as they are each separately retrieved and corresponding tokens are created. In this case, the rate control functionality of the remote network stream I/O manager is redundant and does not further change the stream rate before the stream is transmitted across the network.

Rate control of noninterleaved streams is provided by the remote stream I/O manager during the scaling process 146, in which case the remote stream I/O manager retrieves stream frames from the storage container while skipping over appropriate stream frames to achieve the prespecified stream rate. The streams frames which are skipped over are determined based on the particular compression technology that was applied to the stream. The remote stream I/O manager substitutes virtual presentation units for the skipped stream frames to maintain sequential continuity of the stream.

As explained previously regarding flow control synchronization schemes, a virtual presentation unit comprises a presentation unit with some amount of substitute media data information for maintaining a consistent internal state of stream unit sequence, even while a next sequential unit is unavailable. Here in the case of scaling, where virtual units are employed to scale the transmission rate of streams, virtual units are additionally employed to reduce the amount of presentation unit data that is transmitted.

Accordingly, here a virtual video presentation unit comprises a null presentation unit, having a specified presentation duration and time, or a time stamp, but not containing any frame presentation information. Then, when the remote stream I/O manager substitutes a virtual presentation unit for a skipped stream frame, a transmission packet including the virtual presentation unit is shorter and more quickly transmitted than it would be if the skipped frame was included. When the local stream interpreter and digital presentation subsystem receive and process the null video unit, they interpret that unit as an instruction to represent the most recently presented frame. In this way, the presentation subsystem maintains default video presentation data without requiring that data to be received via a network transmission.

As will be recognized by those skilled in the art of compression technology, it is alternatively possible, using appropriate compression techniques, to substitute partial media information, rather than null information to increase or decrease the transmission rate of presentation streams containing presentation units that will not be presented.

Rate control of interleaved stream is provided by the remote network stream I/O manager upon receipt of the stream tokens form the stream pipes. Here, the remote network stream I/O manager scales 154 the stream tokens as they are processed to form transmittal packets. This is accomplished by processing the stream in a scheme whereby the remote network stream I/O manager skips over appropriate tokens and substitutes virtual presentation unit tokens in their place, depending on the compression technology used, to achieve the specified stream rate.

In this common and important situation of interleaved stream storage, the remote network stream I/O manager participates in stream data flow and thus may be characterized with a particular process cycle and process period. During each of its process cycles, the remote network stream I/O manager processes a single presentation unit and determines if the next sequential presentation unit is to be transmitted based on a transmit decision scheme. Like the process decision schemes described above in connection with synchronization techniques, the transmit decision scheme is implemented based on the timing technique of the stream being processed; if the stream presentation units include embedded time stamps, then the transmit decision scheme is based on an explicit timing count, while implicit timing counting is employed otherwise.

No matter which agent provides the scaling function, only video streams are scaled, while audio stream presentation frames and tokens are processed at the full nominal presentation rate, without skipping any audio presentation frames; this preservation of audio presentation rate inherently prioritizes audio streams over video streams.

The scaling function is, as explained above, dependent on the compression technology employed for a particular frame or stream group. Using, e.g., a key frame-based compression technique, a key frame is an independently selectable frame within a stream that contains information required for decompression of all the following non-key frames dependent on that key frame. Dependent, or non-key, frames are not independently selectable. The motion JPEG format relies on a scheme in which every frame in a stream is a key frame. During the scaling operation, only key frames are skipped over, whereby all non-key frames associated with the skipped key frame are also skipped over. Null frames are then substituted for the key frame and all of its corresponding non-key frames.

Appendices L and M provide C-language pseudocode implementing an implicit timing rate control scheme and an explicit timing rate control scheme. Like the synchronization techniques described previously, the implicit rate control scheme is based on a counting technique and does not require embedded time codes on the stream presentation frames. The explicit rate control scheme is based on the use of time stamps for explicitly determining the presentation and duration time of a given frame. In either implementation, virtual presentation units are generated to accommodate skipped stream frames.

In addition, in either implementation, when skipped stream frames later become available, they are identified and skipped over, thereby being deleted, rather than presented. This presentation unit deletion function, like that employed in the synchronization schemes, maintains a current sequential stream progression. Appendices L and M provide pseudocode for implementing this presentation unit deletion function.

Adaptive Load Balancing

The DVMS of the invention includes the ability to automatically and dynamically sense the load of a packet network in which the system is implemented. Based on the sensed loading, the stream rate control mechanism described above is employed by the system to correspondingly and adaptively balance the load within the network, thereby optimizing the network utility availability.

Referring to FIG. 11B, in the this load balancing scheme, the local network stream I/O manager 90 monitors 206 the stream pipes 32 currently transmitting streams between that manager and the local stream interpreter 28 for variations in the average queue size, i.e., availability of presentation unit tokens, of each pipe. When the average queue size varies significantly, the local network stream I/O manager detects the direction of the change, i.e., larger or smaller. Thereafter, it notifies 208 the local stream controller 24 of the change and requests a new stream presentation token rate to be transmitted as a percentage of the nominal presentation rate, based on the change. In turn, the local stream controller transmits the request to the remote stream controller 84, which in response, instructs the remote stream I/O manager 86 and the remote network stream I/O manager 88 to adjust the stream presentation unit rate to the requested rate.

The requested rate is based on the average queue size in the following scheme. When the queue size increases significantly above a prespecified upper availability, the requested rate is increased; the increased availability indicates that high-speed processing may be accommodated. Conversely, when the queue size decreases significantly below a prespecified lower availability, the requested rate is decreased; the decreased availability indicates that the current rate cannot be accommodated and that a lower rate is preferable.

Alternatively, a user may specify a desired stream presentation rate, that specification being accepted 204 by the local stream controller 24. In turn, the local stream controller sends the request to the remote stream controller for implementation.

In the corresponding reverse process, in which stream frames are stored after being recorded via the local DVMS manager, the remote stream I/O manager scales 200 the stream before storage to reconstruct the stream such that it no longer includes null frames. This function may also be accomplished by the local network stream I/O manager in a scaling process 188 completed before a stream is transmitted.

The DVMS of the invention has been described with particular detail relating to a preferred embodiment. Other embodiments are intended to fall within the scope of the invention. For example, while the DVMS of the invention has been described in a scheme for managing audio and video streams, other media data stream types, e.g., stills, accessed from various media data access points, e.g., a PBX server, are within the scope of the claims. If the DVMS is implemented on a computer system or network in software, programming languages other than the C programming language may be employed, as will be clear to those skilled in the art of programming. Alternatively, the DVMS may be implemented entirely in hardware using standard digital design techniques, as will also be clear to those skilled in the art of digital hardware design.

Appendix A
Local Stream Controller

```
Local_Stream_Controller ( ... ) {
CNTRLR_MSG message;      /* Stream Controller Message structure */
    initialize ( ... );
    while ( for_ever ) {
        message = receive_message ( ... );
        switch ( message.operation ) {
            case OPEN: /* Open a Stream Group Player instance */
                ...
                hStream_Interpreter = Create_Stream_Interpreter ( ... );
                hLocal_Stream_IO_Manager = Create_Local_Stream_IO_Manager ( ... );
                hLocal_Network_Stream_IO_Manager =
                    Create_Local_Network_Stream_IO_Manager ( ... );
                ...
                break;
            case CLOSE:   /* Close a Stream Group Player instance */
                ...
                Delete_Stream_Interpreter ( hStream_Interpreter );
                Delete_Local_Stream_IO_Manager ( hLocal_Stream_IO_Manager );
                Delete_Local_Network_Stream_IO_Manager ( hLocal_Network_Stream_IO_Manager );
                ...
                break;
            case LOAD: /* Load a Stream Group by name */
                ...
                hStream_Group = Create_Stream_Group ( sStream_Group_Container, ... );
                if ( local ( hStream_Group )) {
                    send_message ( hLocal_Stream_IO_Manager, LOAD, hStream_Group, ... );
                }
                else {
                    /* Find and connect to the Remote Stream Controller */
                    hRemote_Stream_Controller = find (hStream_Group, ... );
                    connect (hRemote_Stream_Controller, ... );
                    /* Open a remote Stream Group player instance */
                    send_message ( hRemote_Stream_Controller, OPEN, ... );
```

A1

```
            /* Initiate a remote loading of the Steram Group and
                obtain a handle to the Stream Transport Channel */
            send_message ( hRemote_Stream_Controller, LOAD, hStream_Group,
                    phStream_Channel, ... );
            /* Pass the handle to the Stream Transport Channel to the Local Network Stream I/O
                Manager and fill the Stream Pipes from the network */
            send_message ( hLocal_Network_Stream_IO_Manager, LOAD, hStream_Group,
                    *phStream_Channel, ... );
        }
        ...
        break;
    case UNLOAD:  /* Unload a Stream Group by handle*/
        ...
        break;
    case PLAY: /* Play forward the loaded Stream Group */
        ...
        if ( local ( hStream_Group )) {
            send_message ( hLocal_Stream_IO_Manager, PLAY, hStream_Group, ... );
        }
        else {
            send_message ( hRemote_Stream_Controller, PLAY, hStream_Group, ... );
            send_message ( hLocal_Network_Stream_IO_Manager, PLAY, hStream_Group, ... );
        }
        send_message (hStream_Interpreter, PLAY, ... );
        ...
        break;
    case STOP: /* Stop and rewind the loaded Stream Group */
        ...
        break;
    case PAUSE:    /* Pause the playing Stream Group */
        ...
        break;
        ...
    }
}
}  /* End Local_Stream_Controller ( ) */
```

A2

Appendix B
Stream I/O Manager

```
Stream_IO_Manager ( ... ) {
int  nStreams;      /* Number of independent Streams in a Stream Group */
IOMGR_MSG  message;     /* Stream I/O Manager Message structure */
    initialize ( ... );
    while ( for_ever ) {
        message = receive_message ( ... );
        switch ( message.operation ) {
            case LOAD: /* Load a Stream Group and fill the Stream Pipes */
                state = LOADED;
                /* set number of independent streams in the Stream_Group*/
                nSreams = message.hStream_Group.nStreams;
                ...
                break;
            case UNLOAD:  /* Unload a Stream Group and clear the Stream Pipes */
                state = UNLOADED;
                ...
                break;
            case PLAY: /* Start retrieving data and feeding the Stream Pipes */
                state = PLAYING;
                ...
                break;
            case PAUSE:     /* Stop retrieving data and feeding the Stream Pipes */
                state = LOADED;
                ...
                break;
            ...
            ...
        }
        if ( state == PLAYING ) {
            int i;
            ...
            for ( i = 0; i <= nStreams; i++ ) {
                ...
```

```
                Retrieve ( next presentation unit );
                Enqueue ( next presentation unit );
                ...
            }
            ...
        }
    }
}   /* End Stream_IO_Manager ( ) */
```

Appendix C
Stream Interpreter

```
Stream_Interpreter ( ) {
int  nStreams;     /* Number of independent Streams in a Stream Group */
INTRPRTR_MSG  message;    /* Stream Interpreter Message structure */
    initialize ( ... );
    while ( for_ever ) {
        message = receive_message ( ... );
        switch ( message.operation ) {
            case LOAD: /* set number of independent streams in the Stream_Group*/
                nSreams = message.hStream_Group.nStreams;
                ...
                break;
            case UNLOAD:  /* */
                ...
                break;
            case PLAY: /* */
                ...
                break;
            case PAUSE:    /* */
                ...
                break;
            ...
            ...
        }
        if ( state == PLAYING ) {
            int  i;
            ...
            for ( i = 0; i <= nStreams; i++ ) {
                ...
                Present ( ... );    /* Present the next presentation unit */
                ...
            }
            ...
        }
```

C1

}
} /* End Stream_Interpreter ( ) */

C2

Appendix D
Base Level Implicit Timing Synchronization

```
#define T    < fixed presentation duration of a presentation unit >
int     p;   /* consumed presentation units */
int     t;   /* reference time base */
Present ( ... ) {
boolean done = FALSE;
if (t < p*T) { /* Continue presenting current presentation unit */
    return;
}
while (!done) {
    /* Consume and play a new presentation unit */
    if ((p*T <= t) && (t < (p+1)*T)) {
        Consume_and_Present¹ ( next presentation unit );
        p = p + 1;
        done = TRUE;
    }
    /* Catch up to current time relative to reference time base */
    if ((p+1)*T <= t) {
        Consume_and_Process²( next presentation unit );
        p = p + 1;
    }
}
}    /* End Present ( ) */
```

---

[1]Consume and Present operation refers to any decompression and processing required for presentation.
[2]Consume and Process operation includes decompression and internal state maintenance for algorithms using temporal prediction.

D1

Appendix E
Base Level Explicit Timing Synchronization

```
#define  T    < fixed presentation duration of a presentation unit >
int      p;   /* presentation time of next presentation unit */
int      d;   /* presentation duration of next presentation unit */
int      t;   /* reference time base */
Present ( ... ) {
boolean done = FALSE;
if (t < p + d) {
    /* Continue presenting current presentation unit */
    return;
}
while (!done) {
    /* Get new presentation time and duration */
    p = presentation_time ( next presentation unit );
    d = presentation_duration ( next presentation unit );
    /* Consume and play a new presentation unit */
    if ((p <= t) && (t < (p+d))){
        Consume_and_Present ( next presentation unit );
        done = TRUE;
    }
    if ((p + d) <= t) { /* Catch up to current time relative to reference time base */
        Consume_and_Process ( next presentation unit );
    }
}
}    /* End Present ( ) */
```

E1

Appendix F
Flow Control Implicit Timing Synchronization

```
#define  T    < fixed presentation duration of a presentation unit >
int      p;   /* consumed presentation units */
int      t;   /* reference time base */
int      vpu_count;  /* differential count of virtual presentation units */

Present ( ... ) {
boolean done = FALSE;
while (vpu_count) {   /* Consume and drop redundant presentation units */
    Consume_and_Process ( next presentation unit );
    vpu_count--;
}
if (t < p*T) {  /* Continue presenting current presentation unit */
    return;
}
while (!done) {
    if (Stream_Pipe != EMPTY) {
        if ((p*T <= t) && (t < (p+1)*T)) {
            /* Consume and play a new presentation unit */
            Consume_and_Present ( next presentation unit );
            p = p + 1;
            done = TRUE;
        }
        /* Catch up to current time relative to reference time base */
        if ((p+1)*T <= t) {
            Consume_and_Process ( next presentation unit );
            p = p + 1;
        }
    }
    else {
        if ((p*T <= t) && (t < (p+1)*T)) {
            /* Generate and play a new presentation unit */
            Fabricate( virtual presentation unit );
            vpu_count++;
            Consume_and_Present ( virtual presentation unit );
            done = TRUE;
```

F1

```
            p = p + 1;
        }
    }
}
}   /* End Present ( ) */
```

F2

Appendix G
Flow Control Explicit Timing Synchronization

```
#define  D    < default presentation duration of a virtual presentation unit >
int      p;   /* presentation time of next presentation unit */
int      d;   /* presentation duration of next presentation unit */
int      t;   /* reference time base */

Present ( ... ) {
boolean done = FALSE;
if (t < p + d) {
    /* Continue presenting current presentation unit */
    return;
}
while (!done) {
    if (Stream_Pipe != EMPTY) {
        /* Get new presentation time and duration */
        p = presentation_time ( next presentation unit );
        d = presentation_duration ( next presentation unit );
        if ((p <= t) && (t < (p+d))){ /* Consume and play a new presentation unit */
            Consume_and_Present ( next presentation unit );
            done = TRUE;
        }
        if ((p + d) <= t) { /* Catch up to current time relative to reference time base */
            Consume_and_Process ( next presentation unit );
        }
    } else   {
        p = p + d;
        d = D;
        if ((p <= t) && (t < (p+d))){
            Fabricate( virtual presentation unit );
            Consume_and_Present ( virtual presentation unit );
            done = TRUE;
        }
    }
}
}  /* End Present ( ) */
```

G1

Appendix H
Remote Stream Controller

```
Remote_Stream_Controller ( ... ) {
int  nStreams;    /* Number of independent Streams in a Stream Group */
CNTRLR_MSG message;    /* Stream Controller Message structure */
    initialize ( ... );
    while ( for_ever ) {
        message = receive_message ( ... );
        switch ( message.operation ) {
            case OPEN: /* Open a Stream Group Player instance */
                ...
                hRemote_Stream_IO_Manager = Create_Remote_Stream_IO_Manager ( ... );
                hRemote_Network_Stream_IO_Manager =
                    Create_Remote_Network_Stream_IO_Manager ( ... );
                ...
                break;
            case CLOSE:    /* Close a Stream Group Player instance */
                ...
                Delete_Remote_Stream_IO_Manager ( hRemote_Stream_IO_Manager );
                Delete_Remote_Network_Stream_IO_Manager
                        ( hRemote_Network_Stream_IO_Manager );
                ...
                break;
            case LOAD:/* Load a Stream Group by name */
                ...
                hStream_Group = Create_Stream_Group ( sStream_Group_Container, ... );
                send_message ( hRemote_Stream_IO_Manager, LOAD, hStream_Group, ... );
                /* Obtain a handle to the stream channel from the Remote Network Stream I/O Manager */
                send_message ( hRemote_Network_Stream_IO_Manager, LOAD, hStream_Group,
                        phStream_Channel, ... );
                /* Reply to the Local Stream Cotnroller and return a handle to the stream channel */
                *message.phStream_Channel = *phStream_Channel
                reply_message ( message.sender, ... );
                ...
                break;
```

H1

```
            case UNLOAD: /* Unload a Stream Group by handle*/
                ...
                break;
            case PLAY: /* Play forward the loaded Stream Group */
                ...
                send_message (hRemote_Stream_IO_Manager, PLAY, ... );
                send_message (hRemote_Network_Stream_IO_Manager, PLAY, ... );
                ...
                break;
            case STOP: /* Stop and rewind the loaded Stream Group */
                ...
                break;
            case PAUSE:     /* Pause the playing Stream Group */
                ...
                break;
            ...
        }
    }
}   /* Remote_Stream_Controller ( ) */
```

H2

Appendix I
Remote Stream I/O Manager

```
Remote_Stream_IO_Manager ( ... ) {
int  nStreams;     /* Number of independent Streams in a Stream Group */
IOMGR_MSG  message;     /* Stream I/O Manager Message structure */
    initialize ( ... );
    while ( for_ever ) {
        message = receive_message ( ... );
        switch ( message.operation ) {
            case LOAD: /* Load a Stream Group and fill the Stream Pipes */
                state = LOADED;
                /* set number of independent Streams in the Stream Group*/
                nSreams = message.hStream_Group.nStreams;
                ...
                break;
            case UNLOAD:  /* Unload a Stream Group and clear the Stream Pipes */
                state = UNLOADED;
                ...
                break;
            case PLAY: /* Start retrieving data and feeding the Stream Pipes */
                state = PLAYING;
                ...
                break;
            case PAUSE:    /* Stop retrieving data and feeding the Stream Pipes */
                state = LOADED;
                ...
                break;
            ...
            ...
        }
        if ( state == PLAYING ) {
            int  i;
            ...
            for ( i = 0; i <= nStreams; i++ ) {
                ...
```

I1

```
                    Enqueue ( next presentation unit );
                    ...
            }
            ...
        }
    }
}   /* End Remote_Stream_IO_Manager */
```

Appendix J
Remote Network Stream I/O Manager

```
Remote_Network_Stream_IO_Manager ( ... ) {
int  nStreams;    /* Number of independent Streams in a Stream Group */
IOMGR_MSG  message;    /* Stream I/O Manager Message structure */
int  hStream_Channel;    /* Handle to the Stream Transport Channel */
    initialize ( ... );
    while ( for_ever ) {
        message = receive_message ( ... );
        switch ( message.operation ) {
            case LOAD: /* Load a Stream Group and fill the Stream Pipes */
                state = LOADED;
                /* set number of independent streams in the Stream_Group*/
                nSreams = message.hStream_Group.nStreams;
                /* Create a separate Stream Transport Channel for data flow */
                hStream_Channel = Create_Stream_Channel (message.hStream_Group);
                /* Reply to the Remote Stream Controller and return the Stream Channel*/
                *message.phStream_Channel = hStream_Channel;
                reply_message ( message.sender, ... );
                ...
                break;
            case UNLOAD: /* Unload a Stream Group and clear the Stream Pipes */
                state = UNLOADED;
                ...
                break;
            case PLAY: /* Start retrieving data and feeding the Stream Pipes */
                state = PLAYING;
                ...
                break;
            case PAUSE:    /* Stop retrieving data and feeding the Stream Pipes */
                state = LOADED;
                ...
                break;
            ...
            ...
```

```
        }
        if ( state == PLAYING ) {
            int i;
            ...
            for ( i = 0; i <= nStreams; i++ ) {
                ...
                Transmit ( hStream_Channel, next presentation unit );
                ...
            }
            ...
        }
    }
}   /* End Remote_Network_Stream_IO_Manager ( ) */
```

J2

Appendix K
Local Network Stream I/O Manager

```
Local_Network_Stream_IO_Manager ( ... ) {
int  nStreams;     /* Number of independent Streams in a Stream Group */
IOMGR_MSG  message;    /* Stream I/O Manager Message structure */
int  hStream_Channel;    /* Handle to the Stream Transport Channel */
    initialize ( ... );
    while ( for_ever ) {
        message = receive_message ( ... );
        switch ( message ) {
            case LOAD: /* Load a Stream Group and fill the Stream Pipes */
                state = LOADED;
                /* set number of independent streams in the Stream_Group*/
                nSreams = message.hStream_Group.nStreams;
                /* Receive a separate Stream Transport Channel for data flow */
                hStream_Channel = message.hStream_Channel;
                /* Find and connect to the Remote Network Stream I/O Manager */
                hRemote_Network_Stream_IO_Manager = find (hStream_Channel, ... );
                connect (hRemote_Network_Stream_IO_Manager, ... );
                ...
                break;
            case UNLOAD: /* Unload a Stream Group and clear the Stream Pipes */
                state = UNLOADED;
                ...
                break;
            case PLAY: /* Start retrieving data and feeding the Stream Pipes */
                state = PLAYING;
                ...
                break;
            case PAUSE:    /* Stop retrieving data and feeding the Stream Pipes */
                state = LOADED;
                ...
                break;
            ...
            ...
```

K1

```
        }
        if ( state == PLAYING ) {
            ...
            for ( i = 0; i <= nStreams; i++ ) {
                ...
                Enqueue ( next presentation unit );
                ...
            }
            ...
            Feed_Back ( );
            ...
        }
    }
}   /* End Local_Network_Stream_IO_Manager ( ) */
```

Appendix L
Implicit Timing Rate Control

```
int     p = 0;   /* consumed presentation units */
int     t = 0;   /* reference time base */
int     T;       /* Nominal presentation duration */
int     D;       /* Requested presentation duration */

Transmit ( ... ) {
boolean done = FALSE;
while (!done) {
    if ((p*T <= t) && (t < (p+1)*T)) {
        /* Consume and transmit the next presentation unit */
        Consume_and_Transmit ( next presentation unit);
        p = p + 1;
        done = TRUE;
    }
    if ((p+1)*T <= t) {
        /* Adjust the video rate by transmitting null presentation units */
        Fabricate ( null presentation unit );
        Consume_and_Transmit ( null presentation unit );
        p = p + 1;
    }
}
/* Increment virtual stream time */
t = t + D;
}  /* End Transmit ( ) */
```

L1

Appendix M
Explicit Timing Rate Control

```
int     p;      /* presentation time */
int     d;      /* presentation duration */
int     t = 0;  /* reference virtual time base */
int     D;      /* Requested presentation duration */

Transmit ( ... ) { boolean done = FALSE;

while (!done) { p = presentation_time ( next presentation unit );

d = presentation_duration ( next presentation unit );

if ((p <= t) && (t < (p + d))) {

/* Consume and transmit the next presentation unit */

Consume_and_Transmit ( next presentation unit );

done = TRUE;

} if ((p + d) <= t) {

/* Adjust the video rate by transmitting null presentation units */

Fabricate ( null presentation unit );

Consume_and_Transmit ( null presentation unit );

}

}

/* Increment virtual stream time */ t = t + D;

}  /* End Transmit ( ) */
```

Appendix N
Adaptive Load Balancing with Feedback

```
#define Ncycles      < number of cycles over which average is calculated >
#define Nbands       < number of bands the pipe size is divided into >
int  cycles = 0;          /* count of cycles for averaging */
int  average_sum = 0;     /* count of running sum for average calculation */
int  Stream_Pipe_size;    /* size of Stream Pipe measured in presentation units */
int  previous_average_pipe_size_index = Nbands;
int  Rate_Table[Nbands];  /* Table for converting pipe size index to desired rate */
Feed_Back ( ) {
    boolean feedback = FALSE;
    int average_pipe_size;
    int average_pipe_size_index;
    if ( cycles ) {
        average_sum = average_sum + Stream_Pipe_size;
        cycles--;
    }
    else {
        average_pipe_size = (average_sum / Ncycles) * 100;
        average_pipe_size_index = average_pipe_size / Nbands;
        if (average_pipe_size_index < (previous_average_pipe_size_index - 1)) {
            feedback = TRUE;
            presentation_data_rate = Rate_Table[average_pipe_size_index];
        }
        if (average_pipe_size_index > (previous_average_pipe_size_index + 1)) {
            feedback = TRUE;
            presentation_data_rate = Rate_Table[average_pipe_size_index];
        }
        previous_average_pipe_size = average_pipe_size;
        cycles = Ncycles;
    }
    if ( feedback ) {
        callback ( hLocal_Stream_Controller, FEEDBACK, presentation_data_rate );
    }
}
```

What is claimed is:

1. A computer-based media data processor for controlling the timing of computer processing of digitized continuous time-based media data composed of a sequence of presentation units, each unit characterized by a prespecified presentation duration during a computer presentation of the media data, the media processor comprising:

a reference clock which indicates a start time of presentation processing of the media data presentation units and which maintains a current presentation time as the media data presentation unit sequence is processed for presentation;

a counter for counting each presentation unit in the presentation unit sequence after that presentation unit is processed for presentation, to maintain a current presentation unit count; and a comparator connected to the reference clock and the counter, and programmed with the prespecified presentation duration, the comparator comparing a product of the presentation unit duration and the current presentation unit count, specified by the counter, with the current presentation time, specified by the reference clock, after each presentation unit is processed for presentation, and based on the comparison, releasing a next sequential presentation unit to be processed for presentation when the product matches the current presentation time count, and deleting a next sequential presentation descriptor in that sequence when the product exceeds the current presentation time count.

2. The media data processor of claim 1 wherein the media data presentation unit sequence comprises a video frame sequence including a plurality of intracoded video frames.

3. The media data processor of claim 2 wherein each frame of the video frame sequence comprises an intracoded video frame.

4. The media data processor of claim 3 wherein the video frame sequence comprises a motion JPEG video sequence.

5. The media data processor of claim 2 wherein each of the plurality of intracoded video frames comprises a key frame and is followed by a plurality of corresponding non-key frames, each key frame including media data information required for presentation of the following corresponding non-key frames.

6. The media data processor of claim 1 further comprising a flow controller, connected to said comparator, for receiving an indication from the comparator that a presentation unit should be released for presentation, determining availability of a next presentation unit in the presentation unit sequence to be processed, and based on that availability, generating and releasing a virtual presentation unit of the prespecified presentation duration to be presented as a default presentation unit in place of a next presentation unit when a next presentation unit is not available and until the next presentation unit is available.

7. The media data processor of claim 6 wherein the flow controller is adapted to monitor and identify a previously unavailable presentation unit when that unit is later available, and in response to identification of the later available unit, withholding the unit from release for presentation, whereby the later available unit is not presented.

8. The media data processor of claim 6 wherein the media data presentation unit sequence comprises a motion JPEG video sequence, the presentation units comprise video frames, and wherein each virtual presentation unit comprises a most recently presented video frame.

9. The media data processor of claim 1 wherein the media data presentation unit sequence comprises an audio sequence.

10. The media data processor of claim 1 wherein said clock is adapted to indicate a start time of presentation processing of a plurality of media data presentation unit sequences, the start time being common to the plurality of sequences, and which maintains a current presentation time as the media data sequences are processed for presentation;

a counter for counting each presentation unit in the plurality of presentation unit sequences after that presentation unit is processed for presentation, to maintain a distinct current presentation unit count for each presentation unit sequence; and a comparator connected to the reference clock and the counter, and programmed with the prespecified presentation duration, the comparator comparing for each of the plurality of presentation unit sequences a product of the presentation unit duration and the current presentation unit count of that sequence, specified by the counter, with the current presentation time, specified by the reference clock, after each presentation unit from that sequence is processed for presentation, and based on the comparison, releasing a next sequential presentation unit in that presentation unit sequence to be processed for presentation when the product matches the current presentation time count, and deleting a next sequential presentation unit in that presentation unit sequence when the product exceeds the current presentation time count, whereby the plurality of media data presentation unit sequences are synchronously processed for simultaneous synchronous presentation.

11. The media data processor of claim 10 wherein the plurality of media data presentation unit sequences comprise an intracoded video frame sequence and an audio sequence.

12. A computer-based media data processor for controlling the computer presentation of digitized continuous time-based media data composed of a sequence of presentation units, each unit characterized by a prespecified presentation duration and presentation time during a computer presentation of the media data and further characterized as a distinct media data type, the media data processor comprising:

a media data input manager for retrieving media data from a corresponding media data access location in response to a request for computer presentation of specified presentation unit sequences, determining the media data type of each presentation unit in the retrieved media data, designating each retrieved presentation unit to a specified media data presentation unit sequence based on the media data type determination for that presentation unit, assembling a sequence of presentation descriptors for each of the specified presentation unit sequences, each presentation descriptor comprising presentation unit media data for one designated presentation unit in that sequence, all presentation descriptors in an assembled sequence being of a common media data type, associating each presentation descriptor with a corresponding presentation duration and presentation time, based on the retrieved media data, and linking the presentation descriptors in each assembled sequence to establish a progression of presentation units in each of the sequences; and a media data interpreter, connected to the media data input manager, for accepting from the media data input manager the assembled presentation descriptor sequences one descriptor at a time and releasing the sequences for presentation one presentation unit at a time, indicating a start time of presentation processing of the presentation unit sequences, maintaining a current presentation time as the sequences are processed for presentation, counting each unit in the sequences after that unit is released to be processed for presentation, to maintain a distinct current presentation unit count for each sequence, comparing for each of the presentation unit sequences a product of the presentation unit duration and the current presentation unit count of that sequence with the currently maintained presentation time after each unit from that sequence is processed for presentation, and based on the comparison, releasing for presentation processing a next sequential presentation unit in that sequence when the product matches the currently maintained presentation time count and deleting a next sequential presentation unit in that presentation unit sequence when the product exceeds the currently maintained presentation time count.

13. The media data processor of claim 12 wherein the media data access location comprises a computer storage location.

14. The media data processor of claim 13 further comprising a presentation unit sequence controller for initiating the media data input manager and the media data interpreter, specifying to the media data input manager and the media data interpreter the presentation unit sequences to be presented, and controlling starting and stopping of sequence presentation in response to user specifiedation.

15. The media data processor of claim 13 wherein the specified media data presentation unit sequences comprise a video frame sequence including a plurality of intracoded video frames.

16. The media data processor of claim 15 wherein each frame of the video frame sequence comprises an intracoded video frame.

17. The media data processor of claim 16 wherein the video frame sequence comprises a motion JPEG video sequence.

18. The media data processor of claim 15 wherein each of the plurality of intracoded video frames comprises a key frame and is followed by a plurality of corresponding non-key frames, each key frame including media data information required for presentation of the following corresponding non-key frames.

19. The media data processor of claim 16 wherein the specified media data presentation unit sequences comprise a motion JPEG video sequence and an audio sequence.

20. The media processor of claim 14 wherein the media data interpreter further determines for each specified presentation unit sequence availability of a next presentation descriptor when based on said comparison a next presentation unit should be released for presentation, and based on that availability, generates and releases a virtual presentation unit of the prespecified presentation duration to be presented as a default presentation unit each time a next presentation unit in that sequence is not available for presentation and until the next presentation unit is available.

21. The media processor of claim 20 wherein the local media data interpreter is adapted to monitor and identify a previously unavailable presentation unit when that descriptor is later available, and in response to identification of the later available descriptor, withholding the later available presentation unit from release for presentation, whereby the later available presentation unit is not presented.

22. The media data processor of claim 20 wherein the plurality of media data presentation unit sequences comprises an intracoded video sequence of video frames and an audio sequence of audio samples, and wherein each virtual video presentation unit comprises a most recently presented video frame and each virtual audio presentation unit comprises a silent audio sample.

23. The media data processor of claim 12 wherein the media data retrieved by the media data input manager comprises a storage presentation unit sequence composed of presentation units for the specified presentation unit sequences, presentation units of the specified presentation unit sequences being alternately interleaved to compose the storage presentation unit sequence.

24. The media data processor of claim 12 wherein the media data retrieved by the media data input manager comprises a plurality of storage presentation unit sequences, each storage presentation unit sequence composed of presentation units for a specified presentation unit sequence and all presentation units in a storage presentation unit sequence being of a common media data type.

25. The media data processor of claim 24 wherein the start time of presentation processing indicated by the media data interpreter is common to all of the specified presentation unit sequences, whereby the specified presentation unit sequences are synchronously processed for simultaneous synchronous presentation.

26. The media data processor of claim 25 wherein the specified presentation unit sequences comprise a video presentation unit sequence of intracoded video frames and an audio presentation unit sequence of audio samples, and wherein the media data interpreter prioritizes audio presentation units over video presentation units by generating and releasing a virtual video frame to be presented as a default presentation unit each time a next presentation unit is not available for presentation and until the next presentation unit is available, the virtual video frame comprising a most recently presented video frame.

27. The media data processor of claim 14 wherein the retrieved media data presentation units are encoded in a storage code and compressed, and further comprising a presentation system for decoding the presentation units, decompressing the presentation units, and converting the digitized presentation units to a corresponding analog representation for presentation.

28. The media data processor of claim 12 wherein the media data interpreter maintains the current presentation time at a prespecified time rate such that presentation units of the specified presentation sequences are each presented for a presentation duration different than the prespecified presentation duration.

29. The media data processor of claim 12 wherein the media data interpreter monitors for each specified presentation unit sequence an actual presentation rate of the presentation descriptors in that sequence released for presentation, compares the actual presentation rate with a prespecified nominal presentation rate, and based on the comparison, generates and releases a virtual presentation unit of the prespecified presentation duration to be presented as a default presentation unit each time the monitored presentation rate is greater than the prespecified presentation rate, and based on the comparison, skips over a presentation unit each time the monitored presentation rate is less than the prespecified presentation rate.

30. A computer-based method for controlling the timing of computer processing of digitized continuous time-based media data composed of a sequence of presentation units, each unit characterized by a prespecified presentation duration during a computer presentation of the media data, the method comprising:

indicating a start time of presentation processing of the media data presentation units;

maintaining a current presentation time as the media data presentation unit sequence is processed for presentation;

counting each presentation unit in the presentation unit sequence after that presentation unit is processed for presentation, to maintain a current presentation unit count; and comparing a product of the presentation unit duration and the current presentation unit count with the current presentation time after a presentation unit is processed for presentation, and based on the comparison, releasing a presentation unit next in the presentation unit sequence to be processed for presentation when the product matches the current presentation time count, and deleting a presentation unit next in the presentation unit sequence when the product exceeds the current presentation time count.

31. The media data processor of claim 30 wherein the specified media data presentation unit sequence comprise a video frame sequence including a plurality of intracoded video frames.

32. The media data processor of claim 31 wherein each frame of the video frame sequence comprises an intracoded video frame.

33. The media data processor of claim 32 wherein the video frame sequence comprises a motion JPEG video sequence.

34. The media data processor of claim 31 wherein each of the plurality of intracoded video frames comprises a key frame and is followed by a plurality of corresponding non-key frames, each key frame including media data information required for presentation of the following corresponding non-key frames.

35. The method of claim 30 further comprising:

determining the availability of a next presentation unit in the presentation unit sequence to be processed, and based on that availability, generating and releasing a virtual presentation unit of the prespecified presentation duration to be presented as a default presentation unit in place of the next presentation unit when a next presentation unit is not available and until the next presentation unit is available.

36. The method of claim 35 further comprising:

identifying a previously unavailable presentation unit when that unit is later available; and in response to the identification of the later available unit, withholding the unit from release for presentation, whereby the later available unit is not presented.

37. A computer-based method for controlling the computer presentation of digitized continuous time-based media data composed of a sequence of presentation units, each unit characterized by a prespecified presentation duration and presentation time during a computer presentation of the media data and further characterized as a distinct media data type, the method comprising:

retrieving media data from a computer storage location in response to a request for computer presentation of specified presentation unit sequences;

determining the media data type of each presentation unit in the retrieved media data;

designating each retrieved presentation unit to a specified media data presentation unit sequence based on the media data type determination for that presentation unit;

assembling a sequence of presentation descriptors for each of the specified presentation unit sequences, each descriptor comprising media data for one designated presentation unit in that sequence, each sequence of presentation descriptors being of a common media data type;

associating each presentation descriptor with a corresponding presentation duration and presentation time, based on the retrieved media data;

linking the presentation descriptors of each sequence to establish a progression of presentation units in that sequence;

indicating a start time of presentation processing of the presentation descriptor sequences;

maintaining a current presentation time as the sequences are processed for presentation;

counting each presentation unit in the media data sequences after that unit is processed for presentation, to maintain a distinct current presentation unit count for each sequence;

comparing for each of the presentation unit sequences a product of the presentation unit duration and the current presentation unit count of that sequence with the current presentation time after each presentation unit from that sequence is processed for presentation, and based on the comparison, releasing a presentation unit next in that presentation unit sequence to be processed for presentation when the product matches the current presentation time count, and deleting a presentation unit next in that presentation unit sequence when the product exceeds the current presentation time count.

38. The method of claim 37 wherein the retrieved media data comprises a storage presentation unit sequence composed of presentation units for the specified presentation unit sequences, presentation units of the specified presentation unit sequences being alternately interleaved to compose the storage presentation unit sequence.

39. The method of claim 38 wherein the start time of presentation processing is common to all of the specified presentation unit sequences, whereby the specified presentation unit sequences are synchronously processed for simultaneous synchronous presentation.

40. The media data processor of claim 39 wherein the specified media data presentation unit sequences comprise a video frame sequence including a plurality of intracoded video frames.

41. The media data processor of claim 40 wherein each frame of the video frame sequence comprises an intracoded video frame.

42. The media data processor of claim 1 wherein each of the plurality of intracoded video frames comprises a key frame and is followed by a plurality of corresponding non-key frames, each key frame including media data information required for presentation of the following corresponding non-key frames.

43. The media data processor of claim 41 wherein the specified media data presentation unit sequences comprise a motion JPEG video sequence and an audio sequence.

44. A computer-based media data processor for controlling transmission of digitized media data in a packet switching network, the media data comprising a sequence of continuous time-based presentation units, each unit characterized by a prespecified presentation duration and presentation time during a computer presentation of the media data and further characterized as a distinct media data type, the network comprising a plurality of client computer processing nodes interconnected via packet-based data distribution channels, the media data processor comprising:

a remote media data controller for receiving from a client processing node a request for presentation of specified presentation unit sequences;

a remote media data input manager for receiving from the remote media data controller an indication of the specified presentation unit sequences, and in response to the request, retrieving media data from a corresponding media access location, determining the media data type of each presentation unit in the retrieved media data, designating each retrieved presentation unit to a specified media data presentation unit sequence based on the media data type determination for that presentation unit, assembling a sequence of presentation descriptors for each of the specified presentation unit sequences, each descriptor comprising media data for one designated presentation unit in that sequence, all presentation descriptors in an assembled sequence being of a common media data type, associating each presentation descriptor with a corresponding presentation duration and presentation time, based on the retrieved media data, and linking the descriptors in each assembled sequence to establish a profession of presentation units in each of the specified presentation unit sequences;

a remote network media data manager connected to the remote media data input manager, for accepting from the remote media data manager the assembled specified presentation descriptor sequences one presentation descriptor at a time, assembling transmission presentation unit packets each composed of at least a portion of a presentation descriptor and its media data, all presentation descriptors and media data in an assembled packet being of a common media data type, and releasing the assembled packets for transmission via the network to the client processing node requesting presentation of the specified presentation unit sequences;

a local media data controller for transmitting the request for presentation of specified presentation unit sequences from the client processing node to the remote media data controller via the network and controlling starting and stopping of sequence presentation in response to user specifiedations;

a local network media data manager for receiving from the local media data controller an indication of the specified presentation unit sequences, receiving the transmission presentation unit packets transmitted from the remote network media data manager via the network, designating a presentation unit sequence for each presentation descriptor and its media in the received packets to thereby assemble the presentation descriptor sequences each corresponding to one specified presentation unit sequence, all presentation descriptors and media data in an assembled sequence being of a common media data type, and linking the descriptors in each assembled sequence to establish a progression of presentation units for each of the presentation unit sequences; and a local media data interpreter, connected to the local network media data manager, for accepting the assembled presentation descriptor sequences one descriptor at a time and releasing the sequences for presentation one presentation unit at a time, indicating a start time of presentation processing of the sequences, maintaining a current presentation time as the sequences are processed for presentation, and based on the presentation duration of each presentation unit, synchronizing presentation of the specified presentation unit sequences with the current presentation time.

45. The media data processor of claim 44 wherein the specified media data presentation unit sequences comprise a video frame sequence including a plurality of intracoded video frames.

46. The media data processor of claim 45 wherein each frame of the video frame sequence comprises an intracoded video frame.

47. The media data processor of claim 46 wherein the video frame sequence comprises a motion JPEG video sequence.

48. The media data processor of claim 45 wherein each of the plurality of intracoded video frames comprises a key frame and is followed by a plurality of corresponding non-key frames, each key frame including media data information required for presentation of the following corresponding non-key frames.

49. The media data processor of claim 45 wherein the specified presentation unit sequences comprise a motion JPEG video sequence and an audio sequence.

50. The media data processor of claim 44 wherein the media access location comprises a computer storage location.

51. The media data processor of claim 50 wherein the computer storage location comprises a computer file.

52. The media data processor of claim 44 wherein the local media data interpreter synchronizes presentation of the specified presentation unit sequences by comparing for each of the presentation descriptors in each of the presentation descriptor sequences the presentation time corresponding to that descriptor with the currently maintained presentation time, and based on the comparison, releasing a next sequential presentation unit to be processed for presentation when the corresponding presentation time of that descriptor matches the current presentation time, and deleting a next sequential presentation unit to be processed for presentation when the current presentation time exceeds the corresponding presentation time of that descriptor.

53. The media data processor of claim 44 wherein the local media data interpreter synchronizes presentation of the specified presentation unit sequences by counting each presentation unit in the sequences after that presentation unit is released to be processed for presentation, to maintain a distinct current presentation unit count for each sequence, comparing for each of the presentation unit sequences a product of the presentation unit duration and the current presentation unit count of that sequence with the currently maintained presentation time after a presentation unit from that sequence is released to be processed for presentation, and based on the comparison, releasing a next sequential presentation unit in that presentation unit sequence when the product matches the currently maintained presentation time, and deleting a next sequential presentation unit in that presentation unit sequence when the product exceeds the currently maintained presentation time.

54. The media data processor of claim 52 wherein the local media data interpreter determines for each presentation descriptor sequence availability of a next sequential presentation descriptor in that sequence when the currently maintained presentation time indicates that a presentation unit should be released for presentation, and based on that availability, generates and releases a virtual presentation unit of the corresponding presentation duration to be presented as a default presentation unit each time a next presentation descriptor in that sequence is not available and until a next presentation descriptor is available.

55. The media data processor of claim 53 wherein the local media data interpreter determines for each presentation descriptor sequence availability of a next sequential presentation descriptor in that sequence when based on said comparison a presentation unit should be released for presentation, and based on that availability, generates and releases a virtual presentation unit of the corresponding presentation duration to be presented as a default presentation unit each time a next presentation descriptor in that sequence is not available and until a next presentation descriptor is available.

56. The media data processor of either of claims 54 or 55 wherein the local media data interpreter is adapted to monitor and identify a previously unavailable presentation descriptor when that descriptor is later available, and in response to identification of the later available descriptor, withholding the later available presentation unit from release for presentation, whereby the later available unit is not presented.

57. The media data processor of either of claims 54 or 55 wherein the specified presentation unit sequences comprises a motion video sequence of video frames and an audio sequence of audio samples, and wherein each virtual video presentation unit comprises a most recently presented video frame and each virtual audio presentation unit comprises silent audio samples.

58. The media data processor of either of claims 54 or 55 wherein the specified presentation unit sequences comprise an audio sequence and a video frame sequence composed of a plurality of key video frames, each key frame followed by a plurality of corresponding non-key frames, each key frame including media data information required for presentation of the following corresponding non-key frames, and wherein the local media data interpreter is adapted to monitor and identify a previously unavailable presentation descriptor corresponding to a key frame when that descriptor is later available, and in response to identification of the later available key frame descriptor, withholding the descriptor and any following descriptors, corresponding to non-key frames following the key frame, from release for presentation, whereby the later available key frame and following non-key frames are not presented.

59. The media data processor of claim 50 wherein the media data retrieved by the remote media data input manager comprises a plurality of storage presentation unit sequences, each storage presentation unit sequence composed of presentation units for a specified presentation unit sequence and all presentation units in a storage presentation unit sequence being of a common media data type, and wherein the start time of presentation processing indicated by the local media data interpreter is common to all of the specified presentation descriptor sequences, whereby the presentation unit sequences are synchronously processed for simultaneous synchronous presentation.

60. The media data processor of claim 50 wherein the network comprises a local area network.

61. The media data processor of claim 50 wherein the network comprises a wide area network.

62. The media data processor of claim 60 wherein the remote media data controller advertises to client computer processing nodes, via the network, an indication of specified presentation unit sequences that may be requested from that remote media data controller.

63. The media data processor of claim 44 wherein the media access location comprises a digitized representation of analog media data captured in real time.

64. The media data processor of claim 44 wherein the media access location comprises a PBX server.

65. The media data processor of claim 44 wherein presentation of the specified presentation unit sequences comprises display of the presentation unit sequences.

66. The media data processor of claim 44 wherein presentation of the specified presentation unit sequences comprises VCR tape printing of the presentation unit sequences.

67. The media data processor of claim 65 wherein display of the presentation unit sequences comprises display on a computer monitor.

68. The media data processor of claim 65 wherein display of the presentation unit sequences comprises display on a television monitor.

69. The media data processor of claim 44 wherein presentation of the specified presentation unit sequences comprises recording the sequences at a computer storage location.

70. The media data processor of claim 44 wherein presentation of the specified presentation unit sequences comprises sending the sequences to a PBX server.

71. The media data processor of claim 44 wherein the media access location comprises an access point to a public switch network.

72. The media data processor of claim 44 wherein presentation of the specified presentation unit sequences comprises sending the sequences to an access point in a public switch network.

73. The media data processor of claim 44 wherein the remote media data controller further receives from the local media data controller via the network an indication of a specified presentation data rate at which the specified presentation unit sequences are to be transmitted via the network to the client node, and in response, the remote media data controller indicates the specified presentation data rate to the remote media data input manager and the remote media data network manager;

further wherein the media data retrieved by the remote media data input manager comprises a plurality of storage presentation unit sequences stored in a computer storage location, each storage presentation unit sequence composed of presentation units corresponding to a specified presentation unit sequence and all presentation units in a storage presentation unit sequence being of a common media data type; and further wherein the remote media data input manager designates each of a portion of the presentation unit descriptors as the descriptor sequences are assembled, the portion including a number of descriptors based on the specified presentation data rate, each designated descriptor comprising null media data, to thereby compose the presentation descriptor sequences with only a portion of storage presentation unit media data, whereby the specified presentation unit sequences attain the specified presentation data rate of transmission.

74. The media data processor of claim 44 wherein the remote media data controller further receives from the local media data controller via the network an indication of a specified presentation data rate at which the specified presentation unit sequences are to be transmitted via the network to the client node, and in response, the remote media data controller indicates the specified presentation data rate to the remote media data input manager and the remote media data network manager;

further wherein the media data retrieved by the remote media data input manager comprises a storage presentation unit sequence stored in a computer storage location, presentation units of the storage presentation unit sequence comprising alternately interleaved presentation units from the specified presentation unit sequences; and further wherein the remote network media data manager designates each of a portion of the presentation descriptors as the transmission presentation unit packets are assembled, the portion including a number of descriptors based on the specified presentation data rate, each designated descriptor comprising null media data, to thereby compose the transmission presentation unit packets with only a portion of specified sequence presentation unit media data, whereby the transmission presentation unit packets attain the specified presentation data rate of transmission.

75. The media data processor of either of claims 73 or 74 wherein the specified presentation unit sequences comprise a motion video frame sequence including a plurality of intracoded video frames and an audio sequence.

76. The media data processor of claim 73 wherein the specified presentation unit sequences include an audio sequence composed of audio presentation units having corresponding audio storage presentation units; and wherein the portion of presentation units having a presentation unit sequence designation includes all audio storage presentation units.

77. The media data processor of claim 74 wherein the specified presentation unit sequences include an audio sequence composed of audio presentation units; and wherein the portion of presentation units having a transmission presentation unit packet designation includes all audio presentation units.

78. The media data processor of either of claims 73 or 74 wherein the local media data controller receives from the client node a client user-specified indication of a specified presentation data rate at which the specified presentation unit sequences are to be transmitted to the client node.

79. The media data processor of either of claims 73 or 74 wherein the local network media data manager monitors availability of presentation descriptors as they are accepted by the local media data interpreter one descriptor at a time from the local network media data manager, and based on the availability, indicates the specified presentation data rate to the local media data controller for indication to the remote media data controller.

80. The media data processor of claim 79 wherein the local network media data manager indicates a specified presentation data rate that is higher than a current presentation unit sequence transmission rate when the monitored availability increases to prespecified upper availability.

81. The media data processor of claim 79 wherein the local network media data manager indicates a specified presentation data rate that is lower than a current presentation unit sequence transmission rate when the monitored availability decreases to a prespecified lower availability.

82. A method for controlling transmission of digitized media data in a packet switching network, the media data comprising a sequence of continuous time-based presentation units, each unit characterized by a prespecified presentation duration and presentation time during a computer presentation of the media data and further characterized as a distinct media data type, the network comprising a plurality of client computer processing nodes interconnected via packet-based data distribution channels, the method comprising:

receiving from a client processing node a request for presentation of specified presentation unit sequences;

in response to the request, retrieving media data from a corresponding media access location;

determining the media data type of each presentation unit in the retrieved media data;

designating each retrieved presentation unit to a specified media data presentation unit sequence based on the media data type determination for that presentation unit;

assembling a sequence of presentation descriptors for each of the specified presentation unit sequences, each descriptor comprising media data for one designated presentation unit in that sequence, all presentation descriptors in an assembled sequence being of a common media data type;

associating each presentation descriptor with a corresponding presentation duration and presentation time, based on the retrieved media data;

linking the descriptors in each assembled sequence to establish a progression of presentation units in each of the specified presentation unit sequences;

assembling transmission presentation unit packets each composed of at least a portion of a presentation descriptor and its media data, all presentation descriptors and media data in an assembled packet being of a common media data type; and releasing the assembled packets for transmission via the network to the client processing node requesting presentation of the specified presentation unit sequences.

83. The method of claim 82 further comprising:

receiving at the client processing node the transmission presentation unit packets via the network;

designating a presentation unit sequence for each presentation descriptor and its media data in the received packets to thereby assemble the presentation descriptor sequences each corresponding to one specified presentation unit sequence, all presentation descriptors in an assembled sequence being of a common media data type;

linking the descriptors in each assembled sequence to establish a progression of presentation units for each of the presentation unit sequences;

indicating a start time of presentation processing of the sequences;

maintaining a current presentation time as the descriptor sequences are processed for presentation; and based on the presentation duration of each presentation unit, synchronizing presentation of the specified presentation unit sequences with the current presentation time.

84. The method of claim 82 wherein the specified presentation unit sequences comprise an intracoded video frame sequence and an audio sequence.

85. The method of claim 83 wherein the step of synchronizing presentation of the specified presentation unit sequences comprises:

comparing for each of the presentation descriptors in each of the presentation descriptor sequences the presentation time corresponding to that descriptor with the currently maintained presentation time; and based on the comparison, releasing a next sequential presentation unit to be processed for presentation when the corresponding presentation time of that descriptor matches the current presentation time, and deleting a next sequential presentation unit to be processed for presentation when the current presentation time exceeds the corresponding presentation time of that descriptor.

86. The method of claim 83 wherein the step of synchronizing presentation of the specified presentation unit sequences comprises:
  counting each presentation descriptor in the sequences after that presentation unit is released to be processed for presentation, to maintain a distinct current presentation unit count for each sequence;
  comparing for each of the presentation unit sequences a product of the presentation unit duration and the current presentation descriptor count of that sequence with the currently maintained presentation time after a presentation unit from that sequence is released to be processed for presentation; and
  based on the comparison, releasing a next sequential presentation unit in that presentation unit sequence when the product matches the currently maintained presentation time, and deleting a next sequential presentation unit in that presentation unit sequence when the product exceeds the currently maintained presentation time.

87. The method of claim 83 further comprising:
  receiving via the network an indication of a specified presentation data rate at which the specified presentation unit sequences are to be transmitted via the network to the client node, further wherein the media data retrieved comprises a plurality of storage presentation unit sequences stored in a computer storage location, each storage presentation unit sequence composed of presentation units corresponding to a specified presentation unit sequence and all presentation units in a storage presentation unit sequence being of a common media data type; and
  designating each of a portion of the presentation unit descriptors as the descriptor sequences are assembled, the portion including a number of descriptors based on the specified presentation data rate, each designated descriptor comprising null media data, to thereby compose the presentation descriptor sequences with only a portion of storage presentation unit media data, whereby the specified presentation unit sequences attain the specified presentation data rate of transmission.

88. The method of claim 83 further comprising:
  receiving via the network an indication of a specified presentation data rate at which the specified presentation unit sequences are to be transmitted via the network to the client node, further wherein the media data retrieved comprises a storage presentation unit sequence stored in a computer storage location, presentation units of the storage presentation unit sequence comprising alternately interleaved presentation units from the specified presentation unit sequences; and
  designating each of a portion of the presentation descriptors as the presentation descriptor sequences are assembled, the portion including a number of descriptors based on the specified presentation data rate, each designated descriptor comprising null media data, to thereby compose the transmission presentation unit packets with only a portion of specified sequence presentation unit media data, whereby the transmission presentation unit packets attain the specified presentation data rate of transmission.

89. The method of either of claims 87 or 88 further comprising:
  monitoring availability of presentation descriptors after the descriptors are received at the client node and before the descriptors are presented; and
  based on the availability, indicating the specified presentation data rate via the network.

90. A computer-based media data processor for capturing and controlling transmission of digitized media data in a packet switching network, the media data comprising a sequence of continuous time-based presentation units, each unit characterized by a prespecified presentation duration and presentation time during a computer presentation of the media data and further characterized as a distinct media data type, the network comprising a plurality of client computer processing nodes interconnected via packet-based data distribution channels, the media data processor comprising:
  a local media data controller for indicating user-specified presentation unit sequences to be captured from a client node for recording at a network media access location;
  a local media data interpreter for receiving the specified presentation unit sequences from the client node, assembling a sequence of presentation descriptors for each of the received specified presentation unit sequences, each descriptor comprising media data for one presentation unit in that sequence, all presentation descriptors in an assembled sequence being of a common media data type, associating each presentation descriptor with a corresponding presentation duration and presentation time, based on the retrieved media data, and linking the descriptors in each assembled sequence to establish a progression of presentation units for each of the presentation unit sequences;
  a local network media data manager connected to the local media data interpreter, for accepting from the local media data interpreter the assembled specified presentation descriptor sequences one presentation descriptor at a time, assembling transmission presentation unit packets each composed of at least a portion of a presentation descriptor and its media data, all presentation descriptors and media data in an assembled packet being of a common media data type, and releasing the assembled packets for transmission via the network to the network media access location;
  a remote media data controller for receiving from the local media data controller an indication of the specified presentation unit sequences to be recorded at the network media access location;
  a remote network media data manager for receiving from the remote media data controller an indication of the specified presentation unit sequences, receiving the transmission presentation unit packets transmitted from the local network media data manager via the network, designating a presentation unit sequence for each presentation descriptor and its media data in the received packets to thereby assemble the presentation descriptor sequences each corresponding to one specified presentation unit sequence, all presentation descriptors and media data in an assembled sequence being of a common media data type, and linking the descriptors in each sequence to establish a progression of presentation units for each of the presentation unit sequences; and
  a remote media data output manager for receiving from the remote media data controller an indication of the specified presentation unit sequences, and connected to the remote network media data manager, for accepting the assembled presentation descriptor sequences one descriptor at a time, formatting the accepted sequences and media data in a media access format, and releasing the formatted sequences to the media access location.

91. The media processor of claim 90 wherein the media access location comprises a computer storage location.

92. The media processor of claim 91 wherein the computer storage location comprises computer file.

93. The media processor of claim 90 wherein the specified presentation unit sequences comprise an intracoded video frame sequence and an audio sequence.

94. The media processor of claim 93 wherein the media access location comprises a computer file.

95. The media processor of claim 94 wherein the media access format comprises a storage presentation unit sequence, presentation units of the storage presentation unit sequence comprising alternately interleaved presentation units from the specified presentation unit sequences.

96. The media processor of claim 94 wherein the media access format comprises a plurality of storage presentation unit sequences, each storage presentation unit sequence composed of presentation units for a specified presentation unit sequence and all presentation units in a storage presentation unit sequence being of a common media data type.

97. The media processor of claim 93 wherein the media access location comprises a VCR tape printer.

98. A computer-based method for capturing and controlling transmission of digitized media data in a packet switching network, the media data comprising a sequence of continuous time-based presentation units, each unit characterized by a prespecified presentation duration and presentation time during a computer presentation of the media data and further characterized as a distinct media data type, the network comprising a plurality of client computer processing nodes interconnected via packet-based data distribution channels, the method comprising:

indicating user-specified presentation unit sequences to be captured from a client node for recording at a network media access location;

receiving the specified presentation unit sequences from the client node;

assembling a sequence of presentation descriptors for each of the received specified presentation unit sequences, each descriptor comprising media data for one presentation unit in that sequence, all presentation descriptors in an assembled sequence being of a common media data type;

associating each presentation descriptor with a corresponding presentation duration and presentation time, based on the retrieved media data;

linking the descriptors in each assembled sequence to establish a progression of presentation units for each of the presentation unit sequences;

assembling transmission presentation unit packets each composed of at least a portion of a presentation descriptor and its media data, all presentation descriptors and media data in an assembled packet being of a common media data type; and releasing the assembled packets for transmission via the network to the network media access location.

99. The method of claim 98 further comprising:

receiving the transmission presentation unit packets transmitted via the network;

designating a presentation unit sequence for each presentation descriptor and media data in the received packets to thereby assemble the presentation descriptor sequences each corresponding to one specified presentation unit sequence, all presentation descriptors in an assembled sequence being of a common media data type;

linking the descriptors in each sequence to establish a progression of presentation units for each of the presentation unit sequences;

formatting the accepted sequences and media data in a media access format; and releasing the formatted sequences to the media access location.

100. The method o claim 99 wherein the media access location comprises a computer storage location.

101. The method of claim 100 wherein the computer storage location comprises computer file.

102. The method of claim 100 wherein the specified presentation unit sequences comprise an intracoded video frame sequence and an audio sequence.

103. A computer-based media data processor for controlling the computer presentation of digitized continuous time-based media data composed of a sequence of presentation units, each unit characterized by a prespecified presentation duration and presentation time during a computer presentation of the media data and further characterized as a distinct media data type, the media data processor comprising:

a media data input manager for retrieving media data from a corresponding media data access location in response to a request for computer presentation of specified presentation unit sequences, determining the media data type of each presentation unit in the retrieved media data, designating each retrieved presentation unit to a specified media data presentation unit sequence based on the media data type determination for that presentation unit, assembling a sequence of presentation descriptors for each of the specified presentation unit sequences, each presentation descriptor comprising media data for one designated presentation unit in that sequence, all presentation descriptors in an assembled sequence being of a common media data type, and linking the presentation descriptors in each assembled sequence to establish a progression of presentation units in each of the sequences; and a media data interpreter, connected to the media data input manager, for accepting from the media data input manager the assembled presentation descriptor sequences one descriptor at a time and releasing the sequences for presentation one presentation unit at a time, indicating a start time of presentation processing of the presentation unit sequences, maintaining a current presentation time as the sequences are processed for presentation, counting each unit in the sequences after that unit is released to be processed for presentation, to maintain a distinct current presentation unit count for each sequence, comparing for each of the presentation unit sequences a product of the presentation unit duration and the current presentation unit count of that sequence with the currently maintained presentation time after each unit from that sequence is processed for presentation, and based on the comparison, releasing for presentation processing a next sequential presentation unit in that sequence when the product matches the currently maintained presentation time count, and deleting a next sequential presentation unit in that sequence when the product exceeds the currently maintained presentation time count.

104. A computer-based media data processor for controlling transmission of digitized media data in a packet switching network, the media data comprising a sequence of continuous time-based presentation units, each unit characterized by a prespecified presentation duration and presentation time during a computer presentation of the media data and further characterized as a distinct media data type, the network comprising a plurality of client computer processing nodes interconnected via packet-based data distribution channels, the media data processor comprising:

- a remote media data controller for receiving from a client processing node a request for presentation of specified presentation unit sequences;
- a remote media data input manager for receiving from the media data controller an indication of the specified presentation unit sequences, and in response to the request, retrieving media data from a corresponding media access location, determining the media data type of each presentation unit in the retrieved media data, designating each retrieved presentation unit to a specified media data presentation unit sequence based on the media data type determination for that presentation unit, assembling a sequence of presentation descriptors for each of the specified presentation unit sequences, each descriptor comprising media data for one designated presentation unit in that sequence, all presentation descriptors in an assembled sequence being of a common media data type, and linking the descriptors in each assembled sequence to establish a progression of presentation units in each of the specified presentation unit sequences;
- a remote network media data manager connected to the remote media data input manager, for accepting from the remote media data manager the assembled specified presentation descriptor sequences one presentation descriptor at a time, assembling transmission presentation unit packets each composed of at least a portion of a presentation descriptor and its media data, all presentation descriptors and media data in an assembled packet being of a common media data type, and releasing the assembled packets for transmission via the network to the client processing node requesting presentation of the specified presentation unit sequences;
- a local media data controller for transmitting the request for presentation of specified presentation unit sequences from the client processing node to the remote media data controller via the network and controlling starting and stopping of sequence presentation in response to user specifiedations;
- a local network media data manager for receiving from the local media data controller an indication of the specified presentation unit sequences, receiving the transmission presentation unit packets transmitted from the remote network media data manager via the network, designating a presentation unit sequence for each presentation descriptor and media data in the received packets to thereby assemble the presentation descriptor sequences each corresponding to one specified presentation unit sequence, all presentation descriptors and media data in an assembled sequence being of a common media data type, and linking the descriptors in each assembled sequence to establish a progression of presentation units for each of the presentation unit sequences; and
- a local media data interpreter, connected to the local network media data manager, for accepting the assembled presentation descriptor sequences one descriptor at a time and releasing the sequences for presentation one unit at a time, indicating a start time of presentation processing of the sequences, maintaining a current presentation time as the descriptor sequences are processed for presentation, and based on the presentation duration of each presentation unit, synchronizing presentation of the specified presentation unit sequences with the current presentation time.

105. A computer-based media data processor for capturing and controlling transmission of digitized media data in a packet switching network, the media data comprising a sequence of continuous time-based presentation units, each unit characterized by a prespecified presentation duration and presentation time during a computer presentation of the media data and further characterized as a distinct media data type, the network comprising a plurality of client computer processing nodes interconnected via packet-based data distribution channels, the media data processor comprising:

- a local media data controller for indicating user-specified presentation unit sequences to be captured from a client node for recording at a network media access location;
- a local media data interpreter for receiving the specified presentation unit sequences from the client node, assembling a sequence of presentation descriptors for each of the received specified presentation unit sequences, each descriptor comprising media data for one presentation unit in that sequence, all presentation descriptors in an assembled sequence being of a common media data type, and linking the descriptors in each assembled sequence to establish a progression of presentation units for each of the presentation unit sequences;
- a local network media data manager connected to the local media data interpreter, for accepting from the local media data interpreter the assembled specified presentation descriptor sequences one presentation descriptor at a time, assembling transmission presentation unit packets each composed of at least a portion of a presentation descriptor and its media data, all presentation descriptors and media data in an assembled packet being of a common media data type, and releasing the assembled packets for transmission via the network to the network media access location;
- a remote media data controller for receiving from the local media data controller for receiving from the local media data controller an indication of the specified presentation unit sequences to be recorded at the network media access location;
- a remote network media data manager for receiving from the remote media data controller an indication of the specified presentation unit sequences, receiving the transmission presentation unit packets transmitted from the local network media data manager via the network, designating a presentation unit sequence for each presentation descriptor and media data in the received packets to thereby assemble the presentation descriptor sequences each corresponding to one specified presentation unit sequence, all presentation descriptors in an assembled sequence being of a common media data type, and linking the descriptors in each sequence to establish a progression of presentation units for each of the presentation unit sequences; and
- a remote media data output manager for receiving from the remote media data controller an indication of the specified presentation unit sequences, and connected to the remote network media data manager, for accepting the assembled presentation descriptor sequences one descriptor at a time, formatting the accepted sequences and media data in a media access format, and releasing the formatted sequences to the media access location.

* * * * *

UNITED STATES PATENT AND TRADEMARK OFFICE
CERTIFICATE OF CORRECTION

PATENT NO. : 5,719,786  
DATED : February 17, 1998  
INVENTOR(S) : Nelson et al.

Page 1 of 2

It is certified that error appears in the above-identified patent and that said Letters Patent is hereby corrected as shown below:

IN THE DRAWINGS: Sheet 5, FIG. 6, reference number 36, the phrase "create stream manager" should read --create stream interpreter--; and the figure labeled "STREAM INTERPRETER" should have a reference number --28--. Sheet 6, FIG. 7, the "INTERLEAVED DISK BUFFERS" should be framed in a broken-line box labeled reference number --100--. IN THE SPECIFICATION: Column 1, lines 61 and 64, each occurrence of the word "dock" should read --clock--. Column 2, lines 53-54, the phrase "when the product exceeds the current presentation time count" should read --when the current presentation time count exceeds the product--. Column 4, lines 25-26, the phrase "when the product exceeds the currently maintained presentation time" should read --when the currently maintained presentation time exceeds the product--. Column 10, line 66, the phrase "video frame 108" should read --video frame 110--; and the phrase "audio frame 110" should read --audio frame 108--. Column 12, line 41, the word "sell" should read --self--. Column 14, line 53, the word "stomps" should read --stamps--. Column 15, lines 30-33, the phrase "when the product of processed units and unit duration exceeds the currently maintained time count" should read --when the currently maintained time count exceeds the product of processed units and unit duration--; line 34, the word "then" should read --when--; and line 48, the word "steam" should read --stream--. Column 19, line 54, the number "82" should be --84--. Column 22, line 3, the number "176" should be --174--; and line 40, the word "some" should read --same--. Column 25, line 42, the word "the" should be deleted.

UNITED STATES PATENT AND TRADEMARK OFFICE
CERTIFICATE OF CORRECTION

PATENT NO.   : 5,719,786
DATED        : February 17, 1998
INVENTOR(S)  : Nelson et al.

It is certified that error appears in the above-identified patent and that said Letters Patent is hereby corrected as shown below:

IN THE CLAIMS: Claim 1, column 71, lines 27-28; claim 10, column 72, lines 26-27; claim 30, column 75, lines 16-17; and claim 37, column 76, lines 29-30, each occurrence of the phrase "when the product exceeds the current presentation time count" should read --when the currently maintained presentation time count exceeds the product--. Claim 12, column 73, lines 14-16; and claim 103, column 86, lines 57-59, each occurrence of the phrase "when the product exceeds the currently maintained presentation time count" should read --when the current presentation time count exceeds the product--. Claim 14, column 73, line 26, the word "specifiedation" should read --specification--. Claim 44, column 77, line 22, the word "profession" should read --progression--. Claim 53, column 78, lines 55-56; and claim 86, column 83, lines 18-20, each occurrence of the phrase "when the product exceeds the currently maintained presentation time" should read --when the currently maintained presentation time count exceeds the product--. Claim 100, column 86, line 5, the letter "o" should read --of--. Claim 104, column 87, line 42, the word "specifiedations" should read --specification--. Claim 105, column 88, lines 40-41, delete the second occurrence of the phrase "for receiving from the local media data controller".

Signed and Sealed this

First Day of September, 1998

Attest:

Attesting Officer

BRUCE LEHMAN

Commissioner of Patents and Trademarks